United States Patent
Sapoznikov et al.

(10) Patent No.: US 11,972,456 B2
(45) Date of Patent: Apr. 30, 2024

(54) SYSTEM, METHOD AND DEVICE OPERABLE TO GENERATE FEEDBACK FOR ADJUSTING IN-PROCESS ADVERTISING CAMPAIGNS

(71) Applicant: Active Media Services, Inc., Pearl River, NY (US)

(72) Inventors: Alexander Sapoznikov, Fayetteville, NY (US); Vladyslav Marchenko, Naperville, IL (US); James T. Ou, Forest Hills, NY (US)

(73) Assignee: Active Media Services, Inc., Pearl River, NY (US)

( * ) Notice: Subject to any disclaimer, the term of this patent is extended or adjusted under 35 U.S.C. 154(b) by 0 days.

(21) Appl. No.: 17/484,219

(22) Filed: Sep. 24, 2021

(65) Prior Publication Data

US 2023/0101867 A1 Mar. 30, 2023

(51) Int. Cl.
G06Q 30/00 (2023.01)
G06Q 30/0241 (2023.01)
G06Q 30/0242 (2023.01)

(52) U.S. Cl.
CPC ..... *G06Q 30/0244* (2013.01); *G06Q 30/0246* (2013.01); *G06Q 30/0247* (2013.01)

(58) Field of Classification Search
None
See application file for complete search history.

(56) References Cited

U.S. PATENT DOCUMENTS

| 10,546,317 B2 | 1/2020 | Berrett et al. |
| 10,667,020 B2 | 5/2020 | Ray et al. |
| 10,708,669 B2 | 7/2020 | Francis et al. |

(Continued)

OTHER PUBLICATIONS

PCT/US2022/044210, International Filing Date Sep. 21, 2022, International Search Report and Written Opinion, Date of Mailing Nov. 17, 2022 (9 pages).

(Continued)

*Primary Examiner* — Alvin L Brown
(74) *Attorney, Agent, or Firm* — Barclay Damon LLP

(57) ABSTRACT

A device and method, as disclosed herein, are operable to receive reference data during an in-process period that occurs while an advertising campaign is implemented based on purchase data. The reference data includes first reference data arranged in accordance with a first data organization. The reference data also includes second reference data arranged in accordance with a second data organization that differs from the first data organization. The purchase data includes an actual rate related to one or more ad placements. During the in-process period, with respect to the at least one ad placements, the device and method are operable to determine a plurality of metrics related to the one or more ad placement. The metrics depend at least partially on the reference data. Also, during the in-process period, the device and method are operable to determine a target rate related to the one or more ad placements. The target rate depends at least partially on a plurality of the metrics. The device and method are operable to cause an output device to indicate information based on a difference between the target rate and the actual rate related to the one or more ad placements.

26 Claims, 37 Drawing Sheets

(56) References Cited

U.S. PATENT DOCUMENTS

| | | | |
|---|---|---|---|
| 10,832,291 B1 | 11/2020 | Kamireddy et al. | |
| 2008/0271070 A1* | 10/2008 | Kanojia | H04N 21/2547 725/32 |
| 2017/0208370 A1* | 7/2017 | Ray | H04N 21/266 |

OTHER PUBLICATIONS

IAB; Digital Video Advanced TV Targeting; On or before Dec. 31, 2018 (2 pages).
FreeWheel; Advertising Management, Optimized AD Decisioning; Mar. 24, 2021 (2 pages).
Free Wheel; FreeWheel Drive, Any Audiance, Anywhere; Mar. 24, 2021 (3 pages).
Comscore, Inc.; Activate Cross-Platform Audiences by Turning Granular Data into Actionable Targets; Mar. 15, 2021 (4 pages).
Comscore, Inc.; Press Release, Comscore Joins with Leading Ad Platforms to Help Media Buyers Better Reach Connected TV Audiences ; Sep. 11, 2019 (3 pages).
Adobe Inc., An Advertiser's Guide to Data-Driven, Advanced TV, On or Before Dec. 31, 2019 (27 pages).
Adobe Inc., Adobe Experience Cloud, Mar. 25, 2021, retrieved from the Internet <https://web.archive.org/web/20210325041127/https://business.adobe.com/> (5 pages).
Simulmedia, TV Advertising Reimagined to Achieve Any Business Goal, Jan. 25, 2021, retrieved from the Internet <http://web.archive.org/web/20210125232406/https://www.simulmedia.com/> (7 pages).

* cited by examiner

FIG. 5

REFERENCE DATA SOURCE 1 – DATA ORGANIZATION 1 (EXAMPLE) (90)

| TV Program | (A) Age 5-18 | (B) Age 19-25 | (C) Age 26-50 | (D) Over 50 |
|---|---|---|---|---|
| (1) Good Girls | 1,199,111 | 1,145,110 | 1,367,723 | 1,000,965 |
| (2) The Voice | 1,000,565 | 1,967,723 | 2,189,111 | 1,949,111 |
| (3) Law & Order | 1,899,186 | 1,129,139 | 1,169,113 | 1,139,114 |

REFERENCE DATA SOURCE 2 – DATA ORGANIZATION 2 (EXAMPLE) (92)

| TV Program | (A) Age 22-55 | (B) Age 5-16 | (C) Over 55 | (D) Age 17-22 |
|---|---|---|---|---|
| (1) Good Girls | 1,300,965 | 1,845,110 | 2,198,111 | 1,675,721 |
| (2) Law & Order | 1,639,114 | 4,129,133 | 1,992,183 | 1,969,112 |
| (3) The Voice | 1,349,111 | 2,967,721 | 1,500,564 | 2,789,114 |

FEEDBACK SYSTEM DATA ORGANIZATION (EXAMPLE) (94)

| TV Program | (A) Age 5-18 | (B) Age 19-25 | (C) Age 26-50 | (D) Over 50 |
|---|---|---|---|---|
| (1) Law & Order | | | | |
| (2) The Voice | | | | |
| (3) Good Girls | | | | |

FIG. 6

DATA MAPPER (EXAMPLE)

| SOURCE ID 80, 82 | SOURCE ORIGIN 96 | SYSTEM DESTINATION 98 |
|---|---|---|
| 1 | A1 | A3 |
| 1 | A2 | A2 |
| 1 | A3 | A1 |
| 1 | B1 | B3 |
| 1 | B2 | B2 |
| 1 | B3 | B1 |
| 1 | C1 | C3 |
| 1 | C2 | C2 |
| 1 | C3 | C1 |
| 1 | D1 | D3 |
| 1 | D2 | D2 |
| 1 | D3 | D1 |
| 2 | A1 | C3 |
| 2 | A2 | C1 |
| 2 | A3 | C2 |
| 2 | B1 | A3 |
| 2 | B2 | A1 |
| 2 | B3 | A2 |
| 2 | C1 | D3 |
| 2 | C2 | D1 |
| 2 | C3 | D2 |
| 2 | D1 | B3 |
| 2 | D2 | B1 |
| 2 | D3 | B2 |

| CPM VS ESTIMATE WTD | AUDIENCE V LW | POTENTIAL V LW |
|---|---|---|
| +51.9% | -5.6% | +28.8% |
| $36.74 v | 4W | |
| $24.19 | +0.7% | |

Bar chart: GOLF $48.16, MSNBC $51.08, NBCS $26.39, PARA $33.09, TNT $63.96

Filtered KPIs vs. Actual

| SPEND | SPOTS | CPR INDEX |
|---|---|---|
| $232,245 | 75 | 103 |
| 0.0% | 0.0% | 0.0% |

| AUDIENCE | POTENTIAL | QUALITY |
|---|---|---|
| +5.7% | +117.8% | 104 |
| 0.0% | 0.0% | 0.0% |

| CPM | tCPM | IMPRESSIONS |
|---|---|---|
| $36.74 | $35.44 | 6,033 |
| 0.0% | 0.0% | 0.0% |

| BUYING CPM | | | | RESPONSE TARGET CPM | | | AUDIENCE | | | |
|---|---|---|---|---|---|---|---|---|---|---|
| CPM | vs. EST | vs. LW | CPR Index | tCPM | vs. LW | Velocity | Quality | Potential | tRate | vs.Actual |
| $45.13 | 22.2% | - | 100 | $94.03 | - | 11.6%^ | 48 | 100.9% | $320,415.52 | -17.9% |
| $0 | - | - | 135 | $0 | - | - | 100 | - | $3,780.59 | 5.5% |
| $11.45 | 16.9% | - | 107 | $11.57 | - | -41.4%v | 99 | 94.2% | $5,267.93 | -5.2% |
| $75.93 | -9.8% | 65.2% | 109 | $53.47 | 65.2% | -8.6%v | 142 | 463.6% | $143,282.17 | 6.5% |
| $0 | - | - | - | $0 | - | - | 100 | - | $0.00 | - |
| $45.45 | 77.7% | -24.4% | 102 | $23.67 | -24.4% | 9.6%^ | 192 | 366.7% | $66,340.38 | 16.4% |
| $0 | - | - | - | $0 | - | - | 100 | - | $0.00 | - |
| $93.14 | 162.7% | -15.1% | 100 | $80.29 | -15.1% | 14.9%^ | 116 | 98.9% | $417,342.28 | -13.8% |
| $0 | - | - | - | $0 | - | - | 100 | - | $0.00 | - |

FIG. 18B

| AUDIENCE | | | | |
|---|---|---|---|---|
| Velocity | Quality | Potential | tRate | vs. Actual |
| 11.6% ∧ | 48 | 100.9% | $320,415.52 | -17.9% |
| -41.4% ∨ | 100 | - | $3,780.59 | 5.5% |
| -8.6% ∨ | DTV<br>Avg. Rate: $504.76<br>Spend: $10,600.00<br>tCPM: $0<br>tRate: $533.19 | | Booked: 32<br>Cleared: 21<br>Avg.Quality: 100<br>vs. Actual: 5.6% | -5.2%<br><br>6.5% |
| - | - | - | - | - |
| 9.6% ∧ | 100 | - | - | 16.4% |
| 14.9% ∧ | 116 | 98.9% | $417,342.28 | -13.8% |
| - | 100 | - | $0.00 | - |
| - | - | - | $0.00 | - |

FIG. 23

| Buyline filters 417 | | | | | | |
|---|---|---|---|---|---|---|
| Network | Network ▲ | Rotator | Day Part | Length | Rate | Spend |
| [　　　　⌄] | △ CBS | MF-6:30p-7p | Early News | 030 | $38,500.00 | $38,500 |
| Buyline 418 | △ DTV | M-Su 6a-5:59a | Run of Schedule | 030 | $0.00 | $0 |
| [　　　　⌄] | △ DTV | M-Su 6a-5:59a | Run of Schedule | 030 | $0.00 | $0 |
| Daypart 420 | △ DTV | M-Su 6a-5:59a | Run of Schedule | 030 | $1,840.00 | $9,200 |
| [　　　　⌄] | △ FOXNC | M-F 12a-1a | Late Fringe | 030 | $1,400.00 | $1,400 |
| Length | △ FOXNC | M-F 6a-9a | Early Morning | 030 | $1,500.00 | $4,500 |
| [　　　　⌄] | △ FOXNC | M-F 9a-12p | Daytime | 030 | $4,700.00 | $9,400 |
| ○ Booked | △ FOXNC | M-F 12p-5p | Daytime | 030 | $4,800.00 | $4,800 |
| ○ Cleared | △ FOXNC | M-F 5p-6p | Early News | 030 | $5,800.00 | $17,400 |
| [Clear filters] | △ GOLF | TF 6a-5:59a | Run of Schedule | 030 | $7,745.00 | $7,745 |

FIG. 28

SYSTEM, METHOD AND DEVICE OPERABLE TO GENERATE FEEDBACK FOR ADJUSTING IN-PROCESS ADVERTISING CAMPAIGNS

COPYRIGHT NOTICE

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND

Companies purchase advertising spots from television (TV) station networks. Some companies are buyers, directly purchasing the advertising spots. Other companies hire buyers (e.g., marketing agencies) to purchase the advertising spots. In the advertising spots, sometimes referred to as commercial breaks, the TV networks broadcast the specified advertisements or ads during the applicable TV program.

In the planning stage for buying ad spots for a particular ad, buyers often evaluate data regarding the characteristics of the audience associated with the applicable TV program at the applicable airing time. For example, buyers may consider data related to audience demographics, such as gender, age and race.

The ad purchase process can involve several steps. In one scenario, a buyer submits an offer for a desired inventory of ad spots. If the TV network accepts the offer, the purchased ad spots will be booked. Next, the TV network conducts the clearance process. In the clearance process, the TV network evaluates the details of the purchase requirements for the booked ad spots, such as the proposed price, specified TV program, rotation schedule, and time length for the specified ad. Sometimes, the TV network rejects the price or finds a conflict and, therefore, declines to clear the ad for airing. Other times, to satisfy the requirements, the TV network may clear the ad for a particular airing time, such as 10:30 PM on the days of the rotation schedule. Unfortunate for the buyer, the cleared airing time can result in an audience that fails to satisfy the audience characteristics identified by the buyer in the planning stage. For example, the audience can have an undesirably low viewership or can lack key demographics of importance to the buyer.

Reaching the appropriate audience can be especially important for the type of TV advertising known as direct response TV (DRTV). A DRTV commercial is one that prompts audience members (e.g., viewers and consumers) to respond directly to the seller of the advertised item—usually either by calling a toll-free telephone number, sending a text message, clicking a hyperlink or visiting a website. Some DRTV commercials are relatively short, such as less than two minutes in length. Other DRTV commercials, known as infomercials, are relatively long, such as thirty minutes or more in length.

Once a TV advertising campaign is launched, the results of the campaign (e.g., consumer purchasing activity) can occur during and after the airing of the campaign. With DRTV advertising, consumers are stimulated to make their purchases during the commercial or infomercial. On the other hand, linear TV (TV and DRTV programs aired according to predetermined airing schedules) can result in significant delays in consumer response activity. The response delay of the audience can present a challenge to readily identify factors that indicate the under-performance of the advertising campaign.

Often, DRTV and other TV campaigns fail to generate sufficient consumer purchasing because they fail to reach the appropriate audience. The reason for this failure can be multifactorial. Even after conducting market research before launch, determining the appropriate audience for a particular product or service can be difficult and can involve some degree of trial and error. Also, planners can mistakenly overlook relevant audience data while planning the advertising campaign. Furthermore, audience attributes and audience levels can change after the campaign is launched. For example, a campaign may initially be directed toward age group X. However, after the campaign is launched, a political, health or social event could occur that makes age group Y more appropriate for the advertised item than age group X. Regardless of the cause, the failure to reach the appropriate audience can deprive consumers of opportunities to obtain useful products and services. Also, this failure can deplete advertising budgets without generating the desired purchasing activity.

The foregoing background describes some, but not necessarily all, of the challenges, problems, disadvantages and shortcomings related to advertising campaigns.

SUMMARY

In an embodiment, a method includes accessing ad inventory data related to one or more media providers and receiving a request related to an advertising opportunity. The request has purchase data related to a plurality of ad placements available at a plurality of actual rates. After the request is accepted and each of the ad placements is cleared, the method includes executing a plurality of computer-readable instructions to receive reference data during an in-process period.

The in-process period occurs while an advertising campaign is implemented based on the purchase data. The reference data includes: (a) first reference data received from a first reference data source, wherein the first reference data is arranged in accordance with a first data organization, wherein the first reference data at least partially depends on one or more first events that occur during the in-process period; and (b) second reference data received from a second reference data source having second reference data arranged in accordance with a second data organization that differs from the first data organization, wherein the second reference data at least partially depends on one or more second events that occur during the in-process period.

The method also includes executing the computer-readable instructions to determine a plurality of feedback metrics during the in-process period. The feedback metrics are related to each one of the ad placements. The feedback metrics depend at least partially on the reference data. The feedback metrics include: (a) an audience metric indicating one or more audience attributes of an audience related to the ad placement; (b) an impression cost metric related to the ad placement; (c) a response cost metric indicating both a cost of the ad placement and a market response to the ad placement; and (d) an audience timing metric indicating whether the ad placement was cleared for a time period during which an audience level was above a threshold audience level or below the threshold audience level.

Furthermore, the method includes executing the computer-readable instructions during the in-process period to repeat the determination of one or more of the feedback metrics after a variation in the reference data occurs. Also, the method includes executing the computer-readable instructions during the in-process period to perform the following steps with respect to each one of the ad placements: determining a target rate for the ad placement, wherein the target rate depends on a plurality of the feedback metrics; and causing an output device to indicate a feedback. The feedback includes: (a) a plurality of the feedback metrics; and (b) a rate differential derived from comparing the target rate related to the ad placement to the actual rate related to the ad placement. The feedback is useful for a purpose of adjusting the advertising campaign during the in-process period.

In another embodiment, one or more data storage devices include a plurality of computer-readable instructions that, when executed by a processor, cause the processor to receive reference data during an in-process period that occurs while an advertising campaign is implemented based on purchase data. The reference data has first reference data arranged in accordance with a first data organization and second reference data arranged in accordance with a second data organization that differs from the first data organization. The purchase data has an actual rate related to at least one ad placement. Also, when executed by the processor, the instructions cause the processor to perform the following steps with respect to the at least one ad placement during the in-process period: determine a plurality of metrics related to the at least one ad placement, wherein the metrics depend at least partially on the reference data; determine a target rate related to the at least one ad placement, wherein the target rate depends at least partially on a plurality of the metrics; and cause an output device to indicate information based on a difference between the target rate and the actual rate related to the at least one ad placement.

In yet another embodiment, an assembly includes one or more processors and a non-transitory medium operatively coupled to the one or more processors. The non-transitory medium stores a plurality of computer-readable instructions that, when executed by the one or more processors, cause the one or more processors to receive reference data during an in-process period that occurs while an advertising campaign is implemented based on purchase data. The reference data has first reference data arranged in accordance with a first data organization and second reference data arranged in accordance with a second data organization that differs from the first data organization. The purchase data has an actual rate related to at least one ad placement. Also, the instructions, when executed by the one or more processors, cause the one or more processors to perform the following steps with respect to the at least one ad placement during the in-process period: determine a plurality of metrics related to the at least one ad placement, wherein the metrics depend at least partially on the reference data, determine a target rate related to the at least one ad placement, wherein the target rate depends at least partially on a plurality of the metrics; and cause an output device to indicate information based on a difference between the target rate and the actual rate related to the at least one ad placement.

Additional features and advantages of the present disclosure are described in, and will be apparent from, the following Brief Description of the Drawings and Detailed Description.

BRIEF DESCRIPTION OF THE DRAWINGS

FIG. 5 are examples of data organizations of disparate reference data sources shown in contrast to an example of a feedback system data organization.

FIG. 6 is an example of an embodiment of a data mapper of the feedback system.

FIG. 23 is an enlarged, top view of fifth portions of the interactive placements GUI of FIG. 18.

FIG. 28 is an enlarged, top view of fourth portions of the interactive optimizer GUI of FIG. 24.

DETAILED DESCRIPTION

Figure 1:
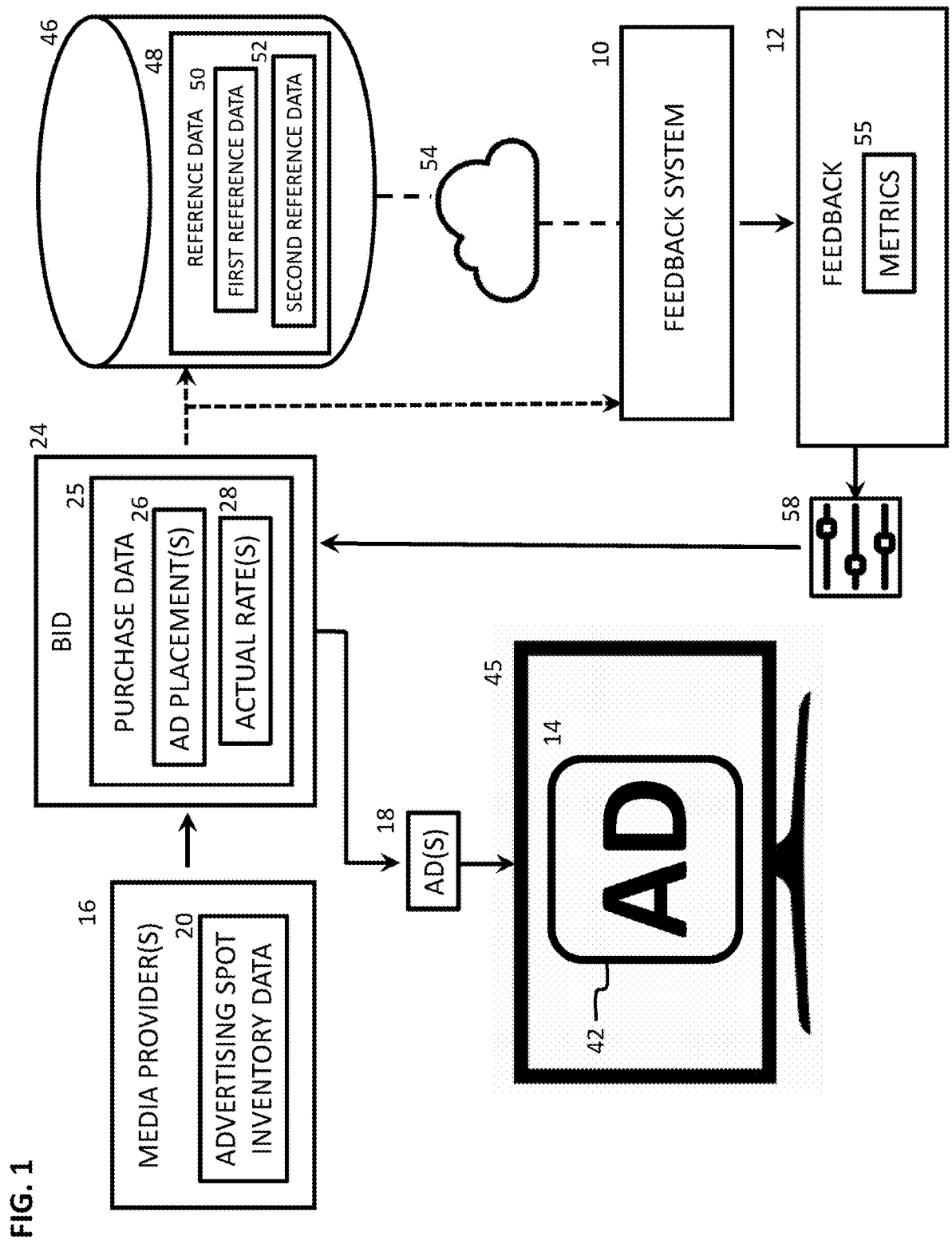
FIG. 1 is a schematic diagram illustrating an embodiment of the feedback system, the generated feedback, and related data flows involving media providers, bids, reference data and ads.

Referring to FIG. 1, in an embodiment, the feedback assembly or feedback system 10 is operable to generate feedback 12. The feedback 12 is usable to analyze, redirect, revise, improve, optimize and adjust in-process advertising campaigns 14. In one example, there are a plurality of media providers 16. Media providers 16 can include any person, organization or entity that publishes or distributes media to an audience. The audience can include members of the public or media subscribers, including viewers and listeners. Media providers 16 can publish or otherwise distribute media on or through a plurality of publication platforms or publication venues, including, but not limited to, TV stations, TV networks, webservers (such as the webservers of YouTube™ and Apple TV™), Internet-based streaming platforms (such as Netflix™, Hulu™ and Pandora™), social media platforms (such as the webservers and mobile applications of Facebook™ and Instagram™), and gaming and entertainment platforms (such as the webservers and mobile applications of video games).

In an embodiment, the media providers 16 include local TV stations (such as local TV station WNBC for the New York City area) and TV networks (such as the TV network, NBC). The TV stations and TV networks can publish media through broadcast TV distribution, cable TV distribution or Internet-based TV distribution. The media published by the media providers 16 can include TV shows (such as a TV program, a TV program series, or an episode of a TV program series), movies, motion pictures, photos, videos, sound recordings, music, video games, social media, or any other type of audio, visual or audiovisual work.

The media providers 16 have or create opportunities for the publication of advertisements or ads 18 alongside or interspersed within their media. An ad 18 can be aired during commercial breaks of TV shows. Alternatively, an ad 18 can be displayed as a banner or popup within the interface of a mobile application, website or TV screen. In the DRTV context, an ad 18 can include a prompt or call to action, implemented to stimulate the audience to promptly perform a response. Such an ad 18 can be a relatively short ad or a relatively long ad, such as an infomercial. The elicited response can include calling a toll-free telephone number, sending a text message, clicking a hyperlink, completing an online survey or petition, visiting a website, making an online purchase or any other act.

The time slots, spaces or spots available for an ad 18 are assets of the media providers 16. In this regard, the available advertising spots constitute the advertising spot inventory of the media providers 16. For any given media provider 16, the specifications of its advertising spot inventory can include details, such as the specified TV network, specified TV program, specified rotation schedules that are available, the specified time length for airing an ad 18, and other specifications. The media providers 16 compile advertising spot inventory data 20 that describes these specifications.

The media providers 16 provide prospective advertising spot buyers with access to the advertising spot inventory data 20. In one scenario, the spot buyers receives data files (e.g., documents, such as Excel™ sheets) from the media providers 16 and then open and review the data files. In another scenario, a media provider 16 may store its advertising spot inventory data 20 in a server. The spot buyers can then access such server through a portal offered by the media provider 16. Alternatively, the spot buyers can electronically interface their server with the media provider's server. In each case, the spot buyer can electronically access or receive a transfer of the advertising spot inventory data 20.

Figure 2:
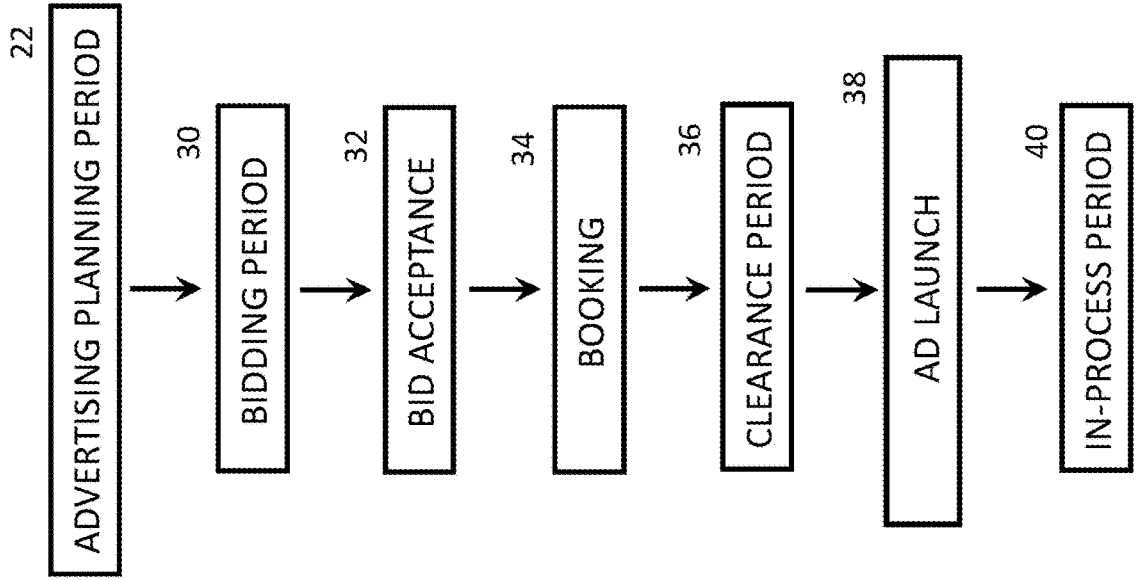
FIG. 2 is a block diagram illustrating an embodiment of a method in which an ad placement transitions from an advertising planning period through an in-process period.

With access to the advertising spot inventory data 20, market research data and information regarding the item to be advertised, the spot buyer performs advertising planning. As shown in FIG. 2, this planning occurs during an advertising planning period 22. After completing the planning and evaluating the advertising spot inventory data 20, the spot buyer can prepare an offer, request or bid 24 for submission to the applicable media provider 16. The bid 24 includes purchase data 25, which, in turn, includes at least one buyline or ad placement 26. Depending on the embodiment, the purchase data 25 can include a plurality of buylines or ad placements 26.

In an embodiment, each ad placement 26 includes a plurality of terms, conditions and specifications, including, but not limited to, the identified TV network, the identified TV program, the specified rotation schedule (e.g., M-F, 12:00 PM-5:00 PM), the day part (e.g., daytime), the time length for the airing of the ad 18 (e.g., 30 seconds), and the actual rate 28 (e.g., $4,800). The actual rate 28, in an embodiment, is the purchase price or bid amount the spot buyer is willing to pay for the ad placement 26.

During the bidding period 30 shown in FIG. 2, the spot buyer submits, electronically transfers or otherwise provides the bid 24 to the applicable media provider 16. Throughout the bidding period 30, the spot buyer and media provider 16 may engage in negotiations and revisions of the bid 24, ending in a version of the bid 24 that the media provider 16 accepts, as indicated by acceptance step 32 shown in FIG. 2. The accepted bid 24 can have an actual rate 28 that differs from the actual rate 28 appearing in the original version of the bid 24. In accepting the bid 24, the media provider 16 may reserve the right to further evaluate factors (such as the actual rate 28) and to decide upon certain variables, including, but not limited to, the specific airing times within the rotation schedule.

After accepting the bid 24, the media provider 16 books the applicable ad placement 26, as indicated by booking step 34 in FIG. 2. After the booking step 34, the media provider 16 conducts the clearance process for the applicable ad placement 26. The clearance process occurs during the clearance period 36. In the clearance process, the media provider 16 evaluates the details of the ad placement 26, such as the latest actual rate 28 (e.g., bid amount), TV network, TV program, rotation schedule and day part. If the media provider 16 finds the actual rate 28 (e.g., bid amount) is competitive and there is no conflict, the media provider 16 will clear the applicable ad placement 26 for airing. In doing so, the media provider 16 may set certain variables of the bid 24, such as the specific airing times within the rotation schedule of the ad placement 26. The media provider's discretionary setting of the variables can significantly downgrade the performance and results of the advertising campaign based on the ad placement 26. As described below, the feedback system 10 provides system users with information useful to identify this problem and adjust future airings to improve performance.

On occasion, the media provider 16 may object to the proposed, actual rate 28 (e.g., bid amount) or find a conflict with its advertising spot inventory data 20, which may have changed since the media provider 16 first received the bid 24. For example, the bid 24 may have specified a rotation schedule of M-W, 9:00 AM-11:00 AM, but at the time of clearance, the media provider 16 may only have inventory for M-W, 6:00 AM-8:00 AM. In the case of a bid amount objection or conflict, the media provider 16 may decline the applicable ad placement 26.

If the media provider 16 clears the ad placement 26 during the clearance period 36, the media provider 16 will air, run, deploy, launch, display or otherwise publish the ad 18 related to the cleared ad placement 26, as indicated by launch step 38 shown in FIG. 2. Once the launch step 38 occurs, the in-process period 40 begins for the launched ad 42, shown in FIG. 1. The in-process period 40 continues for the airing or publication period specified in the bid 24.

The launched ad 42 is associated with purchase data 25, which includes, but is not limited to, the amount spent by the spot buyer on the launched ad 42. The amount spent or spend amount can vary throughout the in-process period 40. For example, the spot buyer can periodically increase the spend by paying additional amounts for additional airings of the launched ad 42.

During the in-process period 40, the deployed or launched ad 42 is distributed to a plurality of media access devices 45 accessible by an audience. The media access devices can include TVs (such as the TV 44 shown in FIG. 1), smartphones, tablets, laptops, computers, smart display devices, smart speakers, theater motion picture systems, and other electronic devices having audio, visual or audiovisual output devices.

There are a variety of events that can occur during the in-process period 40, including, but not limited to, audience responses to the launched ad 42 as well as societal events. The societal events can include, but are not limited to, changes in consumer purchasing activity, consumer spending trends, consumer behavior, consumer demand, media types viewed by consumers, markets, economy, joblessness, interest rates, home values, public health, weather, climate, laws, elected officials, legislators, political climate, war and other types of events.

Identifying and accounting for these events can provide insights into the results and effectiveness of the launched ad 42 as well as the financial efficiency of the campaign based on the launched ad 42. Referring to FIG. 1, the feedback system 10 is electronically or operatively coupled to a reference data storage apparatus 46, which can include one or more different data storage devices or databases. The reference data storage apparatus 46 stores reference data 48, which includes first reference data 50 and second reference data 52. Depending on the embodiment, the feedback assembly or feedback system 10 can be operatively coupled to the reference data storage apparatus 46 through a data network 54, such as a local area network, wide area network (such as the Internet), cellular network, satellite network, wireless network or any other suitable type of data exchange channel.

In an embodiment, the purchase data 25 is transferred to the reference data storage apparatus 46, which is then accessed by the feedback system 10. In another embodiment, the purchase data 25 is transferred directly to the feedback system 10. In yet another embodiment, the system user manually enters or uploads the purchase data 25 into the feedback system 10.

Referring to FIG. 1, during the in-process period 40, the feedback system 10 extracts or pulls reference data 48 from the reference data storage apparatus 46. The feedback system 10 then processes the reference data 48, resulting in feedback 12 for the ad placement 26 associated with the launched ad 42. As described below, the feedback 12 includes a plurality of feedback metrics or metrics 55 relevant to such ad placement 26. The system user of the feedback system 10 can be an ad spot buyer or a consultant providing advice and services to the ad spot buyer. Based on the knowledge within the feedback 12, the system user can engage the applicable media provider 16 to pursue a change or adjustment to one or more of the specification settings 58 of such ad placement 26, including, but not limited to, the actual rate 28, the rotation schedule, the day part or the airing timing point.

Figure 3:
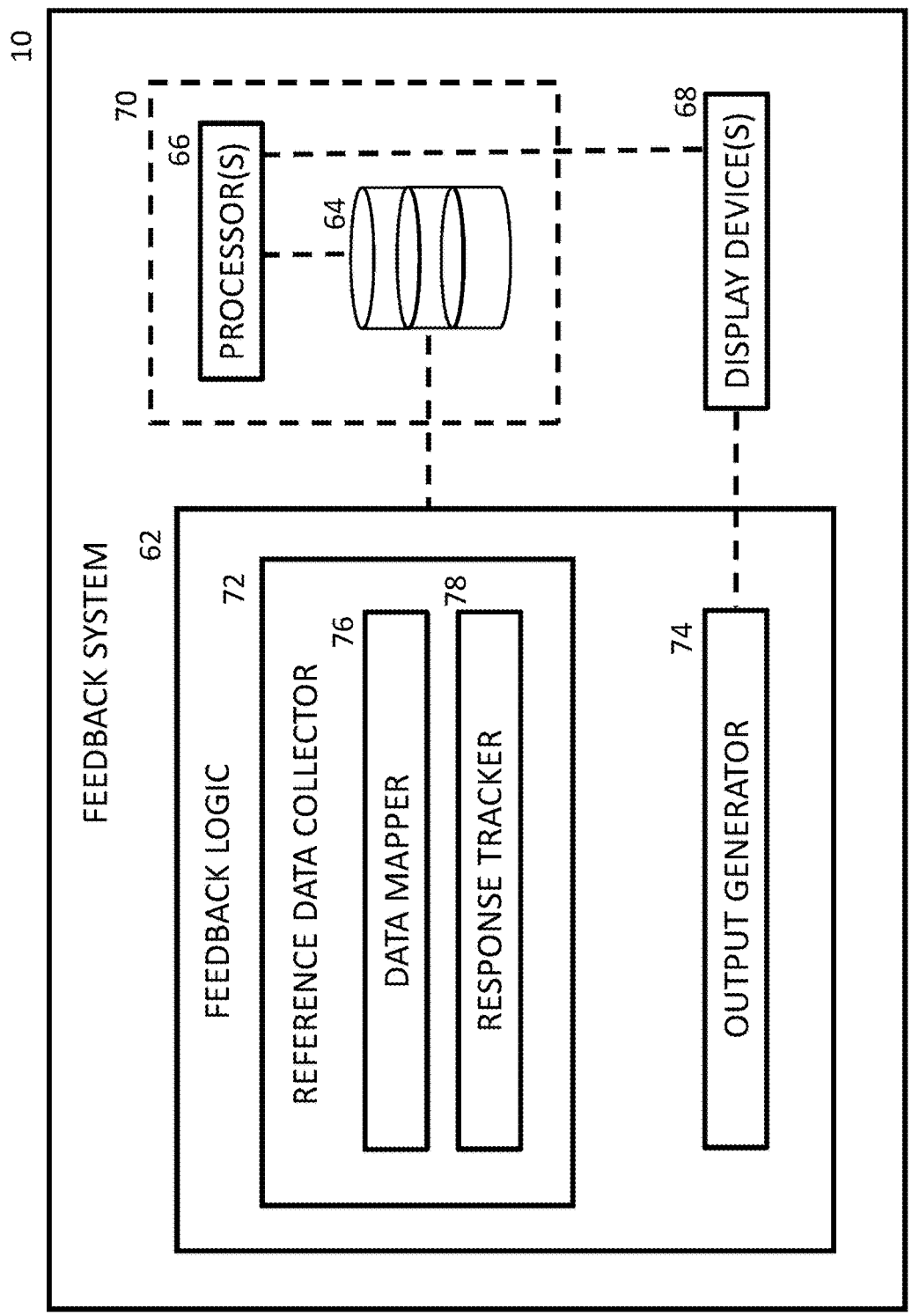
FIG. 3 is a schematic block diagram illustrating an embodiment of the feedback system.

Referring to FIG. 3, in an embodiment, the feedback system 10 includes feedback logic 62. The feedback logic 62 includes or otherwise specifies one or more: (a) computer programs and software programs, including source code; (b) machine-readable instructions and executable instructions, each of which includes object code; and (c) routines, sub-routines, data processing procedures and algorithms. The feedback logic 62 is configured to be stored within one or more data storage devices, memory devices or databases, such as the system storage devices 64. As described below, the system storage devices 64, in an embodiment, store system data 63 (shown in FIG. 7) in addition to the feedback logic 62.

The system storage devices 64 are configured to be electronically or otherwise operatively coupled to one or more processors 66, each of which is configured to process and execute the feedback logic 62. Also, the processor 66 are electronically or otherwise operatively coupled to one or more display devices 68. In an embodiment, a system server 70 includes a combination of the system storage devices 62 and the processors 66 programmed according to the feedback logic 62.

Figure 4:
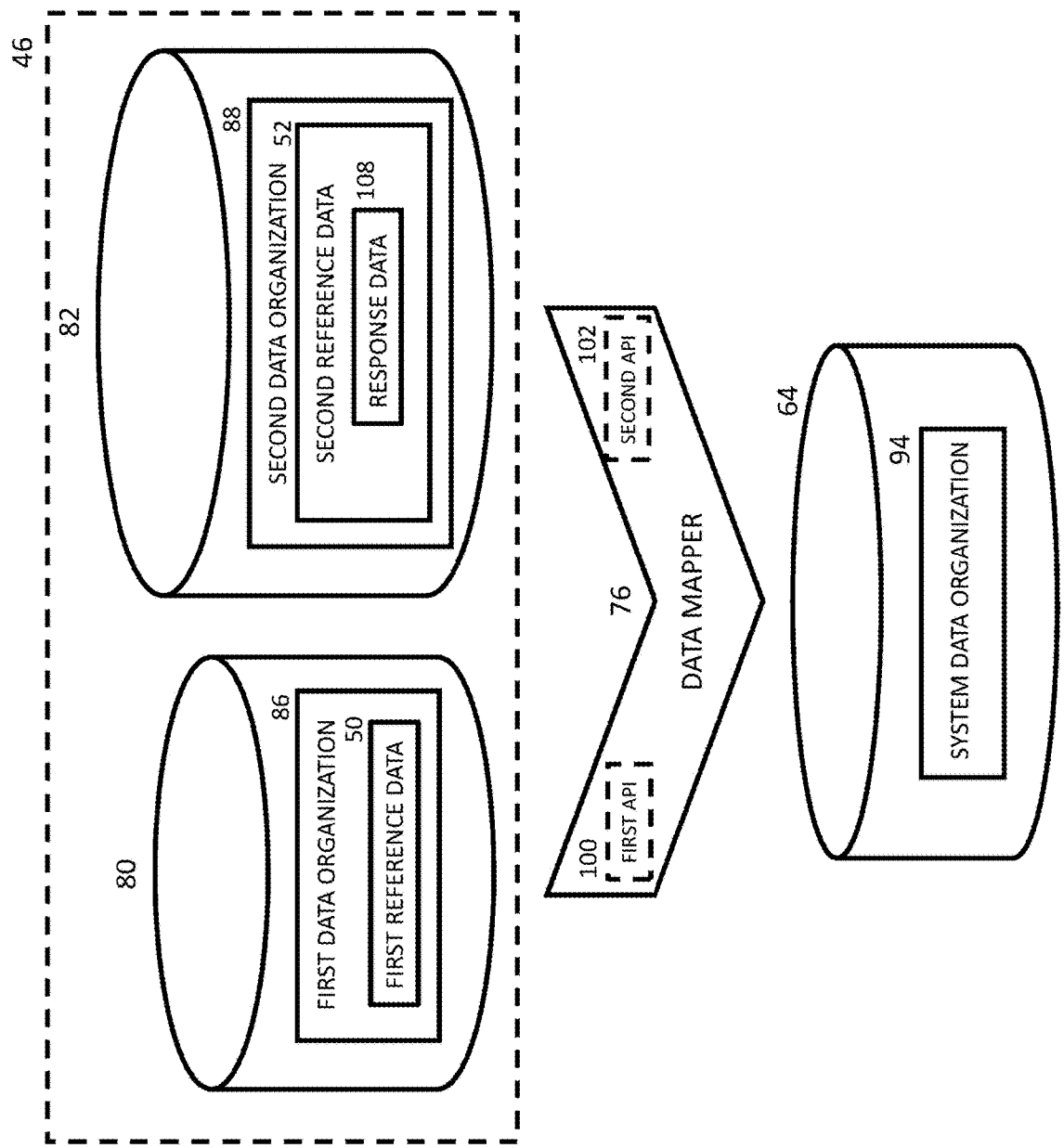
FIG. 4 is a schematic diagram illustrating the mapping of reference data from disparate reference data sources to the system storage devices.

In an embodiment, the feedback logic 62 includes a reference data collector 72 and an output generator 74. The reference data collector 72 includes a data mapper 76 and a response tracker 78. Referring to FIGS. 4-5, in an embodiment, the first reference data 50 is stored in a first reference data source 80, and the second reference data 52 is stored in a second reference data source 82. Each of the reference data sources 80, 82 includes a data storage device, database or server that is electronically accessible by the feedback system 10.

The first reference data source 80 has a first data organization 86, which includes a designated arrangement, structure, architecture or organization of the first reference data 80. The second reference data source 82 has a second data organization 88, which includes a designated arrangement, structure, architecture or organization of the second reference data 82. Depending on the type of the reference data source 82, 84, the first data organization 86 can differ from the second data organization 88. When differing, the reference data sources 82, 84 are disparate.

In the examples shown in FIG. 5, the first reference data source 80 has a first tabular data organization 90 for storing different classes or types of demographic data associated with different TV programs. Likewise, the second reference data source 82 has a second tabular data organization 92 for storing different classes or types of demographic data associated with the same TV programs. As shown, the tabular data organizations 90, 92 are different. In the example shown, the data cell location A1 of the first reference data source 80 provides data for the age group 5-18 corresponding to the Good Girls™ TV program. However, the data cell location A1 of the second reference data source 82 provides data for the age group 26-50 corresponding to the Good Girls™ TV program.

As further shown in the examples in FIG. 5, the system storage devices 64 (shown in FIGS. 3-4) store data in accordance with a system tabular data organization 94. In this example, the system tabular data organization 94 differs from both of the tabular data organizations 90, 92. As shown, the data cell location A1 of the system tabular data organization 94 provides data for the age group 5-18 corresponding to the Law & Order™ TV program.

Because the reference data sources 80, 82 and the system storage devices 64 have different data organizations, the reference data sources 80, 82 and the system storage devices 64 are disparate, creating a challenge for extracting, processing, analyzing and logically using data derived from the disparate reference data sources 80, 82. To overcome this challenge, the data mapper 76 associates each class of data from each of the disparate reference data sources 80, 82 with the appropriate location within the system tabular data organization 94. Referring to FIG. 6, the data mapper 76 includes logic that, with respect to each of the reference data sources 80, 82, assigns or maps the source's origin 96 to the desired system destination 98. Based on this mapping, for example, the system destination A1 for the class of data relating to age 5-18 and Law & Order™, receives this same class of data from origin A3 of reference data source 80 and from origin B2 of reference data source 82.

Referring back to FIG. 4, in an embodiment, the data mapper 76 includes a first application programming interface (API) 100 and a second API 102. The first API 100 is associated with the first data organization 86 and the system tabular data organization 94. The second API 102 is associated with the second data organization 88 and the system tabular data organization 94. Through the first API 100, the feedback system 100 programmatically interfaces with the first reference data source 80 to extract first reference data 50 from the first reference data source 80 and transfer the extracted reference data 103 to the logically-designated location within the system storage devices 64, as illustrated in FIGS. 4-6. Through the second API 102, the feedback system 100 programmatically interfaces with the second reference data source 82 to extract second reference data 52 from the second reference data source 82 and transfer the extracted reference data 103 to the logically-designated location within the system storage devices 64, as illustrated in FIGS. 4-6.

It should be understood that, although FIG. 4 illustrates two reference data sources 80, 82, the feedback system 10 is operable with additional reference data sources, such as five, ten, fifty or more data sources. In an embodiment, the APIs 100, 102 are configured to cause the processors 66 to automatically extract reference data 48 from the reference data sources 80, 82 in accordance with a designated time schedule, such as every minute, every hour, daily, weekly or in accordance with any other suitable updating time parameter.

In an embodiment, entities other than system users operate and populate the reference data sources 80, 82 with reference data 48. The reference data 48 is based on the purchasing of ad spots in the advertisement industry by the spot buyer's competitors and others, advertising costs, the attributes, characteristics and levels of the audience (including demographics data), response by the audience, and the performance of ads. The entities implement procedures to continuously or periodically update the reference data sources 80, 82 with additional reference data 48 based on new activity in the advertising industry.

In an embodiment, the reference data sources 80, 82 include the following databases: (a) one or more impression databases published by The Nielson Company or an affiliate of The Nielson Company; (b) one or more competitor airing databases published by The Nielson Company or an affiliate of The Nielson Company; (c) one or more Mediamark™ Research & Intelligence databases published by GfK SE or an affiliate of GfK SE; and (d) one or more consumer demographics databases published by Resonate Networks, Inc. or an affiliate of Resonate Networks, Inc.

Among other types of data, the reference data sources 80, 82 collect advertising campaign data relating to the cost per one thousand impressions (CPM) incurred by spot buyers, including the competitors of system users and their spot-buying clients. A single impression, in an embodiment, is a single count of a single audience member or viewer (natural person) associated with a single household. Therefore, the single airing of the launched ad 42 in a single advertising spot can result in three impressions for a single household known to have three audience members or viewers.

Figure 8:
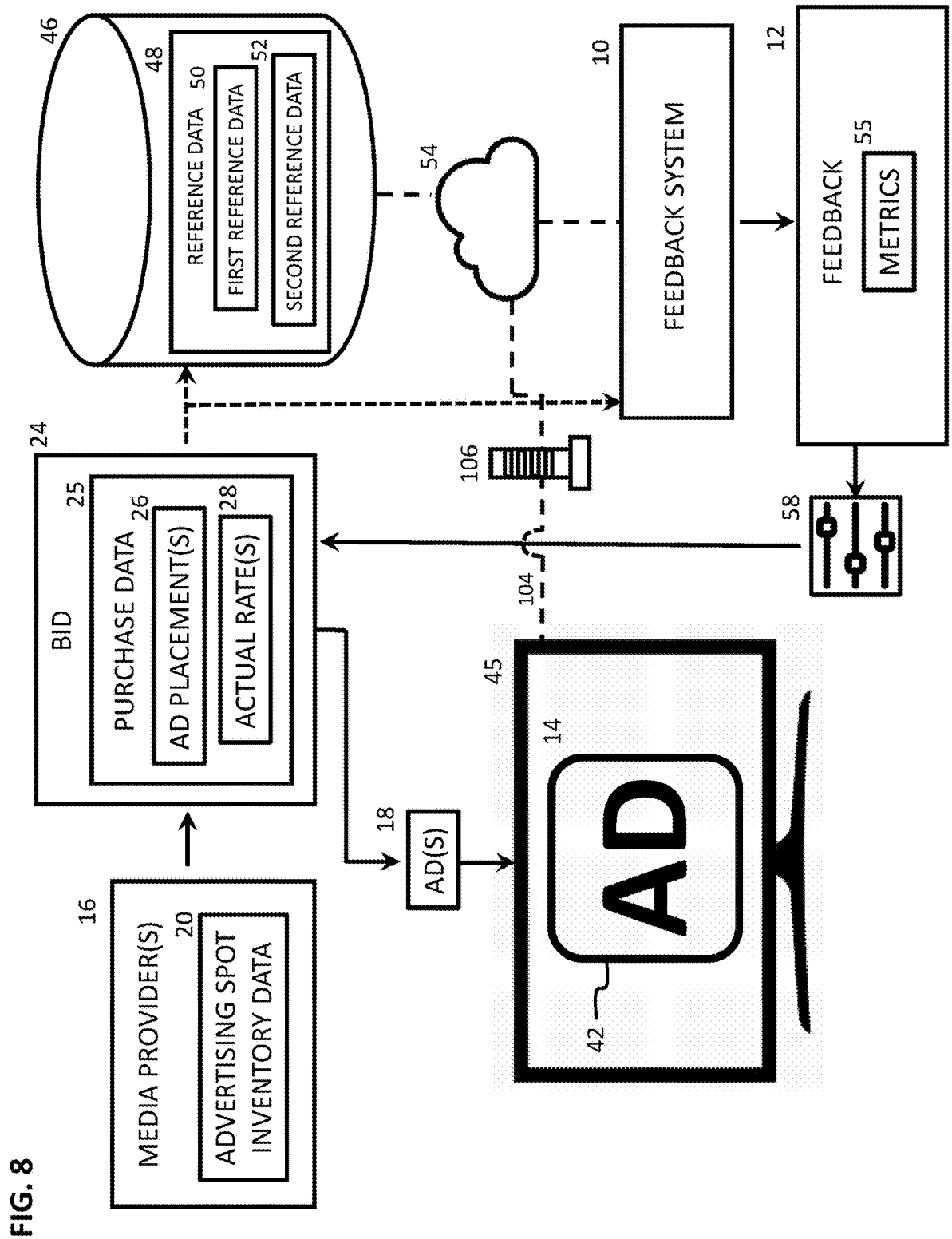
FIG. 8 is a schematic diagram illustrating an embodiment of the feedback system, the generated feedback, and related data flows involving media providers, bids, reference data and ads, illustrating a data communication channel between the media access devices 45 and one or more webservers.

Referring to FIG. 8, in an embodiment, the media access devices 45 are electronically or otherwise operatively coupled to the data network 54, as indicated by the data communication channel 104. In an embodiment, during the in-process period 40 of the advertising campaign 14, the launched ad 42 prompts or stimulates audience members to carry out a response, as described above. For example, the launched ad 42 may prompt audience members to use their media access devices 45 to perform an online purchase of a product at a specified website hosted by a webserver 106. When the members perform these purchases, the webserver 106 receives inputs from the media access device 45 and completes the purchase transactions based on the inputs. In addition, the webserver 106 transmits response data 108 to the reference data storage apparatus 46, as shown in FIG. 4. In the example shown in FIG. 4, the response data 108 is part of the second reference data 52. However, the response data 108 can be part of the first reference data 50 or parts of both the first reference data 50 and the second reference data 52.

The reference data 48 (including the response data 108) can dynamically vary during the in-process period 40. This is because the reference data storage apparatus 46 constantly or periodically receives new or updated reference data 48 during the in-process period 40. The cause of the updated reference data 48 can include a plurality of different events, including, but not limited to, the societal events described above, the data updating policies or procedures of the managers of the reference data storage apparatus 46, and the influx of response data 108.

During the in-process period 40 of the advertising campaign 14, the feedback system 10 periodically performs a pulse check or data check by processing the current state of the reference data 48 (including the response data 108) to account for the updated reference data 48. Upon or shortly after each data check, the feedback system 10 applies the feedback logic 62 to produce or generate the feedback 12. Accordingly, each data check can result in different feedback 12.

As indicated above, the feedback 12 includes a plurality of metrics 55. Depending on the embodiment, the metrics 55 can be quantitative, qualitative or a combination thereof. In addition, a metric 55 can be an index or be based on an index. Such a metric 55 can include a parameter or indicator expressed in terms of a differential, percentage, a comparison of a variable parameter to a base parameter, or a symbol expressing a change in a direction, such as a positive sign, a negative sign, an upward arrow or a downward arrow.

Figure 7:
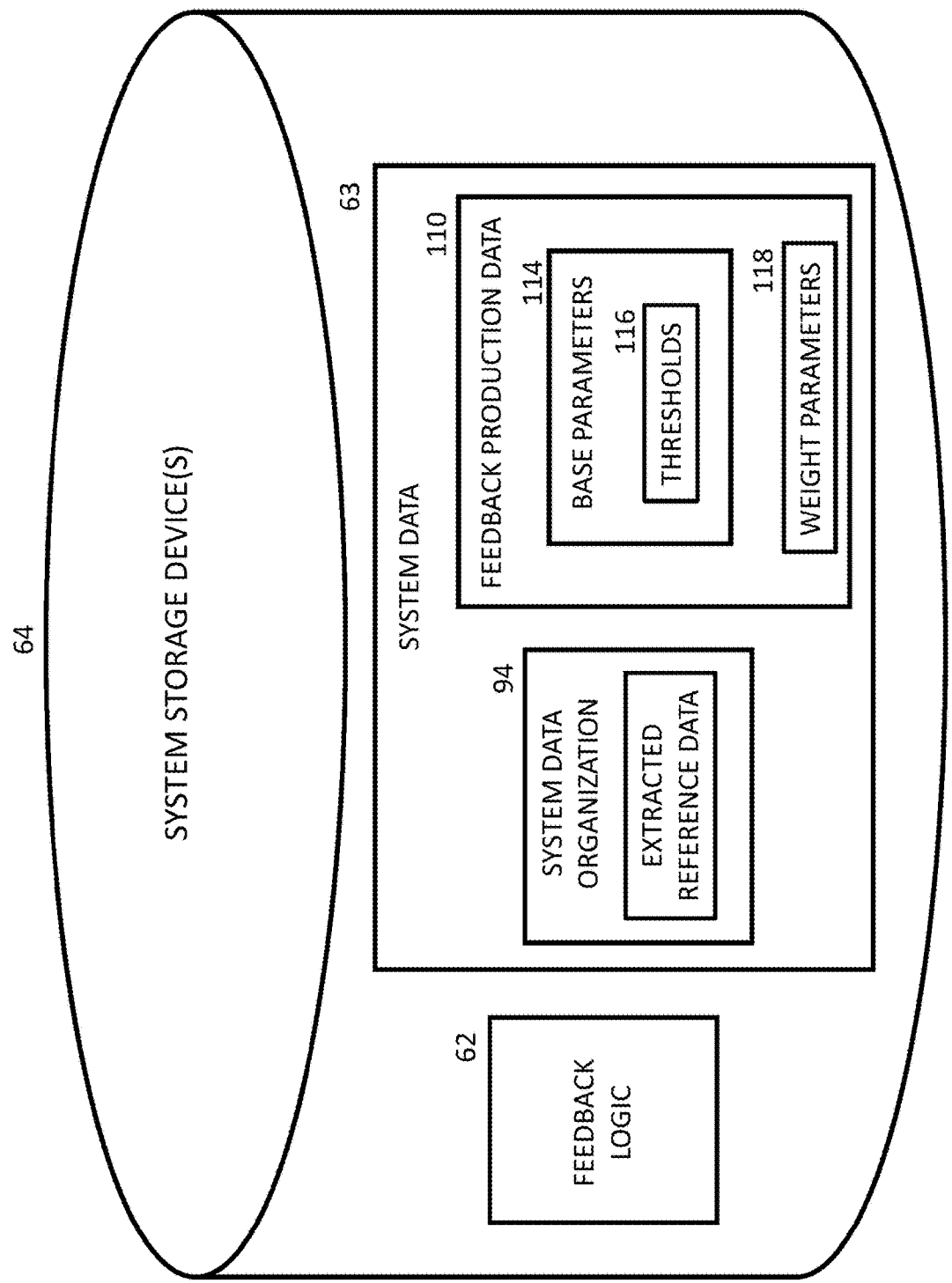
FIG. 7 is a schematic diagram of the system storage devices, illustrating an embodiment of feedback logic and system data.

Referring to FIG. 7, in an embodiment, the system storage devices 64 includes feedback production data 110. The feedback system 10 applies and uses the feedback production data 110 to determine, produce or otherwise generate the feedback 12. In this embodiment, the feedback production data 110 includes a plurality of different base parameters 114, which include a plurality of different thresholds 116. The feedback production data 110 also includes a plurality of different weight parameters 118.

Figure 9:
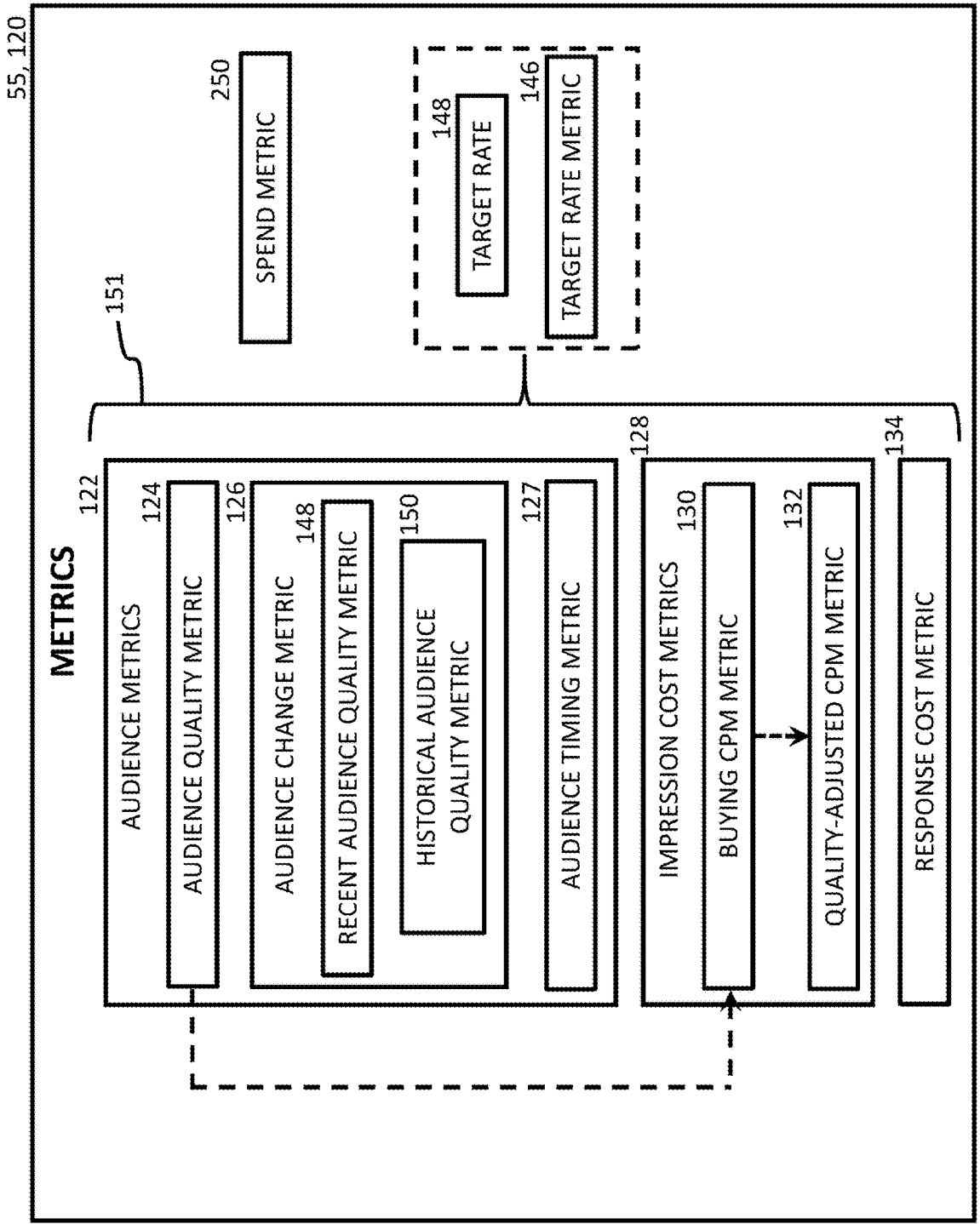
FIG. 9 is a schematic diagram illustrating an embodiment of the metrics generated by the feedback system.
Figures 10, 10A, 10B:
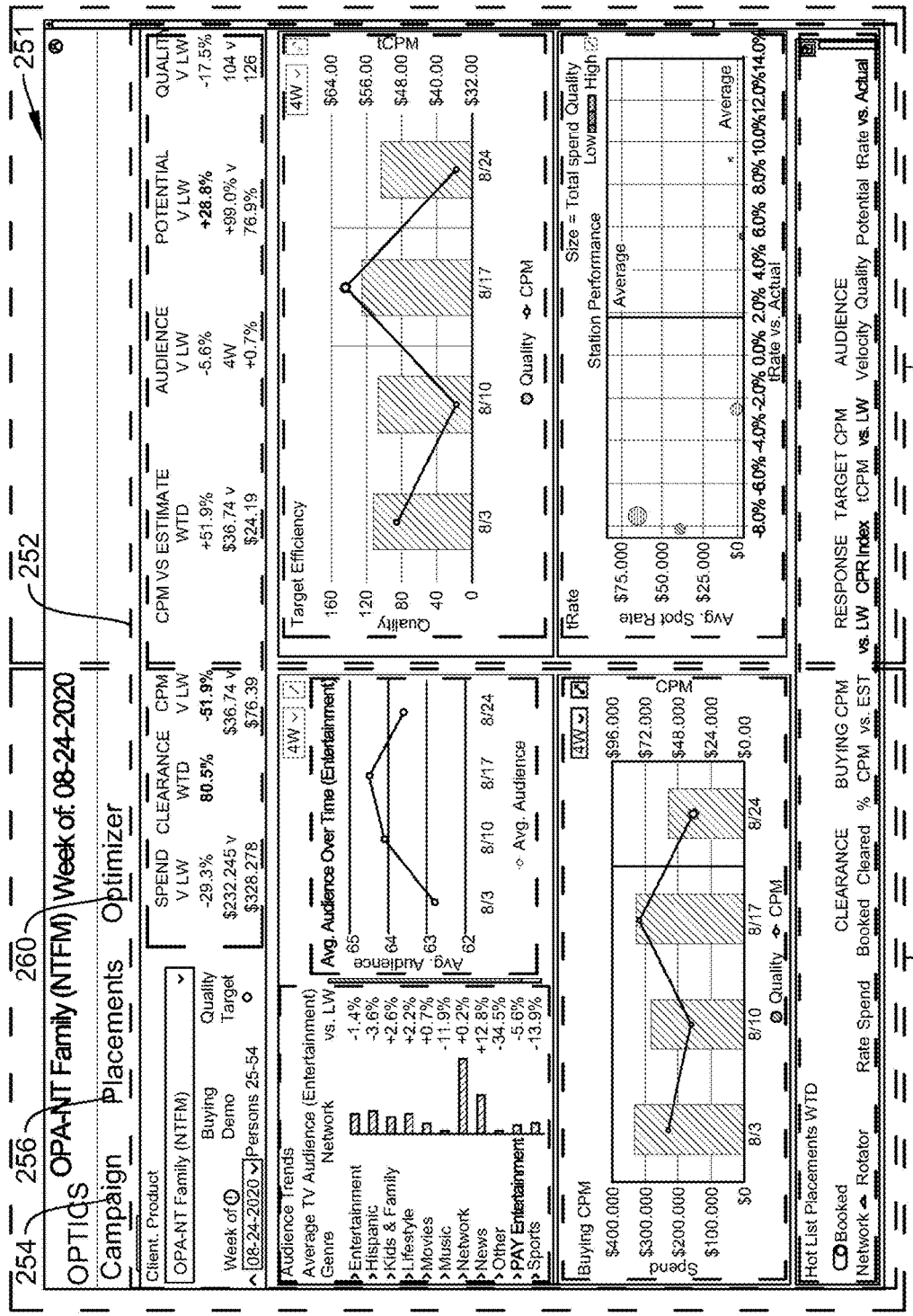
FIG. 10 is a top view of an example of an embodiment of a GUI set generated by the feedback system, illustrating an example of an embodiment of an interactive campaign GUI generated by the feedback system.
FIG. 10A is an enlarged, top view of the left part of the GUI of FIG. 10.
FIG. 10B is an enlarged, top view of the right part of the GUI of FIG. 10.
Figure 10A:
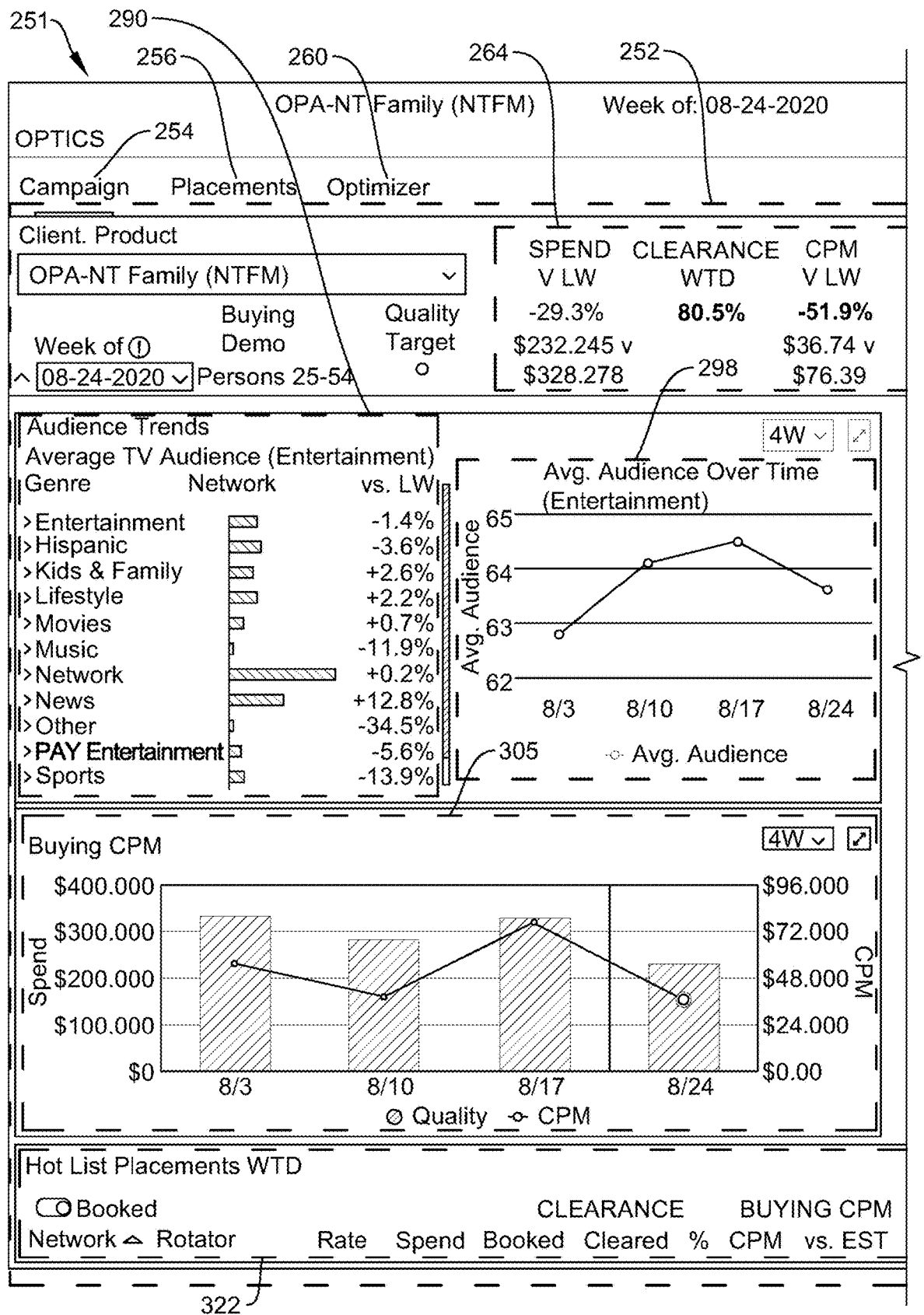
Figure 10B:
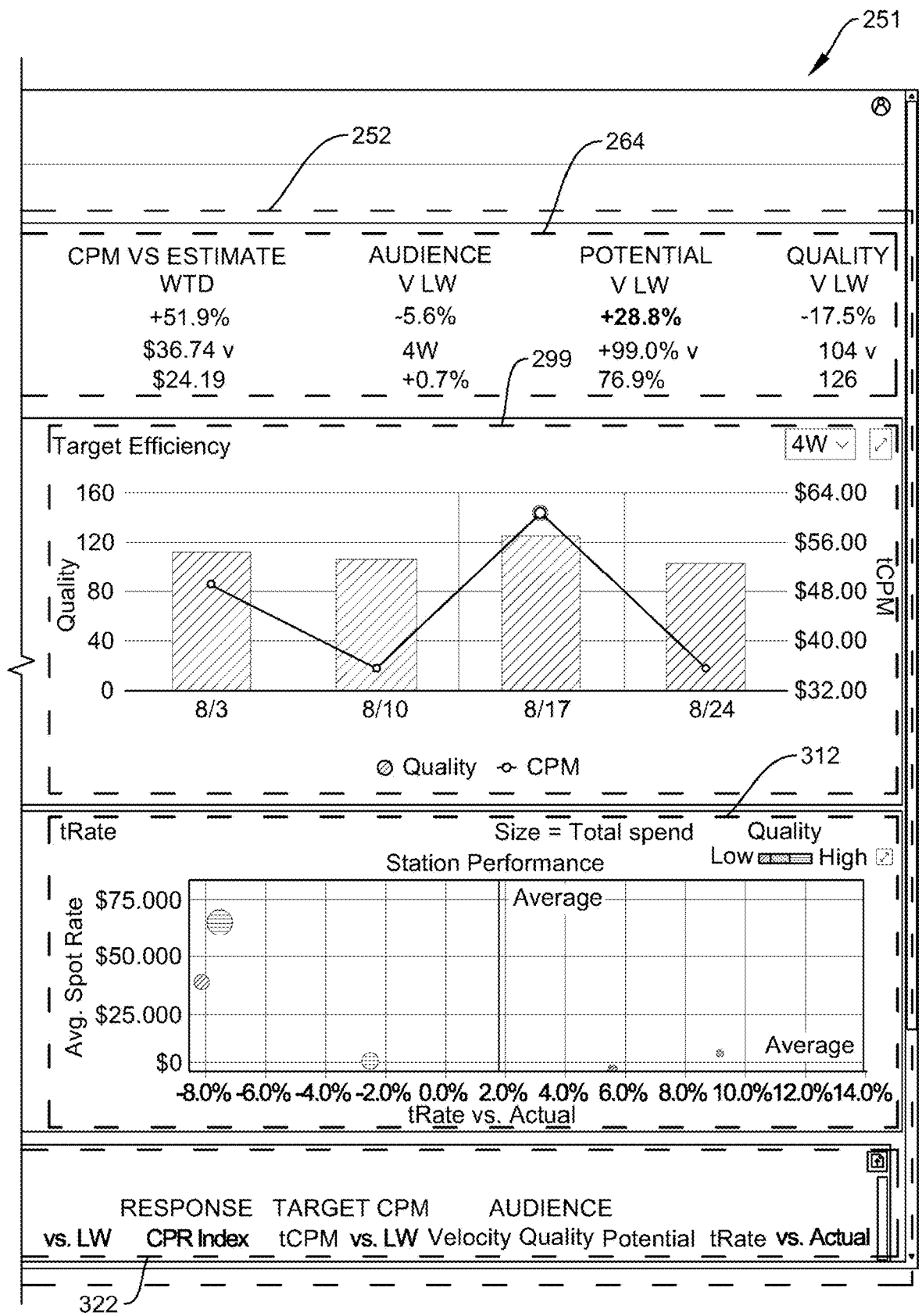

Referring to FIG. 9, in an embodiment, the feedback system 10 generates a set of metrics 55 in relation to each one of the ad placements 26. In this embodiment, the metrics 55 include a plurality of index metrics 120. The feedback logic 62 specifies a plurality of mathematical functions and comparison functions. Each of the index metrics 120 is the result of applying one or more of such functions to at least one of the base parameters 114 to perform a comparison to the base parameter 114.

In an embodiment, the index metrics 120 include: (a) a plurality of audience metrics 122, including an audience quality metric 124, an audience change metric 126, and an audience timing metric 127; (b) a plurality of impression cost metrics 128, including a buying CPM metric 130 and a target or quality-adjusted CPM metric 132; (c) a response cost metric 134; and (d) a target rate metric 146.

The audience quality metric 124 indicates the quality of the audience reached by the analyzed ad placement 26. The quality of the audience can include one or more attributes or characteristics of the audience, including, but not limited to, demographic attributes, including, but not limited to, gender, age, race, consumption preferences, income level, behavioral data and lifestyle data. Depending on the embodiment, the quality of the audience can be qualitatively or quantitatively identified, ascertained, assessed or determined. In an embodiment, the base parameter 114 includes data (e.g., a rule, requirement or specification) that represents a targeted demographic for a targeted audience for the analyzed ad placement 26. For example, the targeted demographic may be women over thirty five years of age. Depending on the embodiment, the system user can establish or set this base parameter 114 based on predetermined criteria or based on instructions or input provided by the relevant spot buyer. By processing the extracted reference data 103, the feedback system 10 determines the actual quality of the audience reached by the ad placement 26. In an embodiment, the feedback system 10 parses the extracted reference data 103 according to the classes or categories of program name, station name, news genre and sports genre. After parsing, the feedback system 10 determines the audience quality associated with each such category. With respect to each such category, the feedback system 10 compares the determined audience quality to the relevant base parameter 114 (e.g., the targeted demographic). Based on this comparison, the feedback system 10 generates the audience quality metric 124 as an index. The audience quality metric 124 indicates the proximity of the determined audience quality to the targeted audience quality.

In an embodiment, the audience quality metric 124 is expressed in the form of an audience quality number or score that can vary relative to a threshold audience quality number or score of one hundred. An audience quality score of one hundred indicates a moderate or average audience quality reached by the ad placement 26, that is, a moderate proximity to the targeted demographic. An audience quality score below one hundred indicates a relatively low audience quality reached by the ad placement 26, that is, a relatively great distance from the targeted demographic. An audience quality score above one hundred indicates a relatively high audience quality reached by the ad placement 26, that is, a relatively close distance to the targeted demographic. As the in-process period 40 continues, the audience quality metric 124 will fluctuate (increasing or decreasing) depending on changes in the extracted reference data 103. By frequently or periodically reviewing the audience quality metric 124, the system user can gather information that is useful to steer and adjust the ad placement 26 during the in-process period 40.

The audience change metric 126 indicates the flux or change in the audience quality metric 124 of the analyzed ad placement 26 over a period of time. In an embodiment, the audience change metric 126 represents the magnitude or velocity of the change in the audience quality metric 124. In one example, the feedback system 10 determines a recent audience quality metric 148 for the most recent week in which the launched ad 42 was aired. The feedback system 10 also processes reference data 48 for a time segment (e.g., a week, day, hour, fifteen minute segment or other segment) immediately preceding such week to determine a historical audience quality metric 150. For indexing purposes, the historical audience quality metric 150 serves as the base parameter 114. The feedback system 10 then compares the recent audience quality metric 148 to the historical audience quality metric 150, resulting in the audience change metric 126. The feedback system 10 generates the audience change metric 126 as an index.

In an embodiment, the audience change metric 126 is expressed in the form of a percentage representing the percentage change of the recent audience quality metric 148 to the historical audience quality metric 150. This percentage change can be an increase (such as +37.3%) or a decrease (such as −65.9%). A percentage increase can indicate a substantial increase in audience quality over the evaluated time segment, and a percentage decrease can indicate a substantial decrease in audience quality over the relevant time segment. As the in-process period 40 continues, the audience change metric 126 will fluctuate (increasing or decreasing) depending on changes in the extracted reference data 103. By frequently or periodically reviewing the audience change metric 126, the system user can gather information that is useful to steer and adjust the ad placement 26 during the in-process period 40.

The audience timing metric 127 indicates whether the analyzed ad placement 26 was cleared for an airing time point at which the actual audience level was above or below a threshold audience level. For example, the spot buyer may have specified a rotation schedule of M-F, 12:00 PM-5:00 PM for the ad placement 26, a twenty second ad. Since the media providers 16 control the clearance process, it is within their discretion to select the airing time point within the rotation schedule. For example, a media provider 16 may select an airing time point of 1:45 PM (M-F), or a media provider may select airing time points of 3:00 PM (M-W)

and 12:30 PM (TH-F). The airing time point can affect the audience level because the audience level can significantly vary throughout the time span of the rotation schedule.

In this embodiment, the thresholds 116 include data that represents the threshold audience level. The threshold audience level can be quantitative, qualitative or a combination thereof. Depending on the embodiment, a system user can establish or set the threshold audience level based on predetermined criteria or instructions or based on input provided by the relevant spot buyer. In one example, based on the extracted reference data 103, the feedback system 10 determines the actual, average audience levels that correspond to the audience timing points for the past four weeks of the in-process period 40. The feedback system 10 compares that actual audience levels (or an average thereof) to the corresponding threshold audience level. Based on that comparison, the feedback system 10 generates the audience timing metric 110 as an index.

In an embodiment, the audience timing metric 127 is expressed in the form of an audience timing percentage. An audience timing metric 127 of one hundred percent corresponds to the threshold audience level, which, in turn, corresponds to a moderate or average audience level. The average audience level can be determined based on competitor data. An audience timing metric 127 at a peak (greater than 100%) corresponds to a relatively high audience level. An audience timing metric 127 at a valley (less than 100%) corresponds to a relatively low audience level. For example, the audience timing metric 127 may be 82% to represent that the actual audience level for the analyzed ad placement 26 was less than average or otherwise relatively low. This would indicate an underperformance of the analyzed ad placement 26 with respect to audience level. Furthermore, this indicates the spot buyer has the potential to improve the advertising performance by working with the applicable media provider 16 to change or adjust the future airing time points for the analyzed ad placement 26. As the in-process period 40 continues, the audience timing metric 127 will fluctuate (increasing or decreasing) depending on changes in the extracted reference data 103. By frequently or periodically reviewing the audience timing metric 127, the system user can gather information that is useful to steer and adjust the ad placement 26 during the in-process period 40.

The buying CPM metric 130 indicates the level of the actual CPM of the analyzed ad placement 26 compared to a targeted or estimated CPM for the analyzed ad placement 26. The estimated CPM serves as a base parameter 114 for indexing purposes. Depending on the embodiment, the system user can establish or set this base parameter 114 based on predetermined criteria or based on instructions or input provided by the relevant spot buyer. In an example, the targeted or estimated cost per impression may be $10.00 per impression. The spot buyer may have spent $100,600 to purchase the spots for the ad placement 26, targeting the demographic of women over the age of thirty five—the targeted or core audience. The feedback system 10 processes the reference data 48 that includes core buying CPM, such as CPM based on Nielsen™ buying demographics of the targeted audience. As a result of processing the reference data 48, the feedback system 10 generates the impression result, such as, for example, a count of 10,332,278 impressions for women over the age of thirty five. Next, the feedback system 10 determines the cost per impression of $12.64 by processing the following: $100,600/(10,332,278/1,000).

Next, the feedback system 10 compares the determined cost per impression to the estimated cost per impression, resulting in the buying CPM metric 130. In an embodiment, the buying CPM metric 130 is expressed in the form of a percentage representing the percentage difference between the determined cost per impression and the estimated cost per impression. This percentage difference can be indicated with a positive percentage and red color (e.g., +X % in red text), indicating the determined cost per impression is X % greater than the estimated cost per impression. Alternatively, the percentage difference can be indicated with a negative percentage and green color (e.g., −Y % in green text), indicating the determined cost per impression is Y % less than the estimated cost per impression. As the in-process period 40 continues, the buying CPM metric 130 will fluctuate (increasing or decreasing) depending on changes in the extracted reference data 103. By frequently or periodically reviewing the buying CPM metric 130, the system user can gather information that is useful to steer and adjust the ad placement 26 during the in-process period 40.

The target or quality-adjusted CPM metric 132 indicates the cost per impression determined by the feedback system 10, adjusted to account for the quality of the audience reached by the analyzed ad placement 26. If the audience quality is high, the quality-adjusted CPM metric 132 will indicate a decreased cost per impression to account for the added value of the high quality audience. On the other hand, if the audience quality is low, the quality-adjusted CPM metric 132 will indicate an increased cost per impression to account for the added value of the high quality audience. Continuing with the example described above, the feedback system 10 may have generated a cost per impression of $12.64 for the analyzed ad placement 26 that targeted women over the age of thirty five. As shown in FIG. 9, the feedback system 10 mathematically applies the audience quality metric 124 to the buying CPM metric 130 to generate the quality-adjusted CPM metric 132. In this example, the audience quality may be relatively high, corresponding to an audience quality metric 124 of one hundred sixteen. The feedback system 10 determines the quality-adjusted CPM metric 132 of $10.90 by processing the following: ($12.64/116)×100. This quality-adjusted CPM metric 132 informs the spot buyer that, even though the cost per impression is $12.64, the higher quality of the audience equates to a cost per impression that, after adjusted to account for quality, is $10.90, significantly less than $12.64. As the in-process period 40 continues, the quality-adjusted CPM metric 132 will fluctuate (increasing or decreasing) depending on changes in the extracted reference data 103. By frequently or periodically reviewing the quality-adjusted CPM metric 132, the system user can gather information that is useful to steer and adjust the ad placement 26 during the in-process period 40.

The response cost metric 134 indicates the financial efficiency of the analyzed ad placement 26, taking into account the cost incurred for the ad placement 26 and the level of response from the audience, such as the quantity of purchases of the advertised item over a designated time segment. The response tracker 78 (shown in FIG. 3) enables the feedback system 10 to generate the response data 108 (shown in FIG. 4) during the in-process period 40. Based on the response tracker 78, the feedback system 10 continuously or periodically (e.g., daily, once per hour, once per minute, once per ten seconds or once per second) monitors or otherwise tracks the extracted reference data 103 during the in-process period 40. By executing the response tracker 78, the feedback system 10 generates the response data 108.

The response data 108 indicates or corresponds to a determined response level, which can be quantitative, qualitative or a combination thereof.

Referring to FIG. 7, the thresholds 116 include a response threshold against which the determined response level is compared. Depending on the embodiment, the system user can establish or set the response threshold based on predetermined criteria or instructions or based on input provided by the relevant spot buyer. In one example, the determined response level is the actual, average response level per week that occurred during, for example, the past four weeks of the in-process period 40. The feedback system 10 compares that actual response level to the corresponding response threshold. Based on this comparison and the cost incurred for the ad placement 26 during such four weeks, the feedback system 10 generates the response cost metric 134 as an index. The response cost metric 134 indicates a financial efficiency of the analyzed ad placement 26. This financial efficiency provides a measure of the magnitude of the response output that is caused by the magnitude of the cost input or, in other words, the financial efficiency is based on the ratio of response output/cost input.

In an embodiment, the response cost metric 134 is expressed in the form of a response cost number or score that can vary relative to a threshold number of one hundred. A response cost score of one hundred indicates a moderate or average financial efficiency of the analyzed ad placement 26. The average financial efficiency can be determined based on competitor data. A response cost score below one hundred indicates a relatively low financial efficiency of the analyzed placement 26. A response cost score above one hundred indicates a relatively high financial efficiency of the analyzed ad placement 26. As the in-process period 40 continues, the response cost metric 134 will fluctuate (increasing or decreasing) depending on changes in the cost data and response data 108. By frequently or periodically reviewing the response cost metric 134, the system user can gather information that is useful to steer and adjust the ad placement 26 during the in-process period 40.

As shown in FIG. 9, the target rate metric 146 includes or is based on a target rate 148. The target rate 148 is a vetted, fair or justifiable price for the analyzed ad placement 26, taking into account one or more of the primary index metrics 151. The primary index metrics 151 include one or more of the audience metrics 122, one or more of the impression cost metrics 128, and the response cost metric 134, or any combination of the foregoing metrics 120. In an embodiment, the target rate 148 depends on the audience quality metric 124, the audience change metric 126, the audience timing metric 127, the buying CPM metric 130 and the response cost metric 134. During the in-process period 40, the feedback system 10 continuously or periodically (e.g., daily, once per hour, once per minute, once per ten seconds or once per second) processes such metrics to generate the target rate 148, including updates thereof.

As described above with respect to FIG. 1, the reference data 48 includes the actual rate 28 paid by the ad buyer for the analyzed ad placement 26. In an example, the actual rate 28 may be $4,700.00, and the target rate 148 may be $4,696.94. This indicates that the spot buyer has overpaid for the analyzed ad placement 26. The spot buyer may use this valuable insight and information to engage the applicable media provider 16 to pursue a change or adjustment to one or more of the specifications of such ad placement 26, including, but not limited to, a decrease in the actual rate 28. In another example, the actual rate 28 may be $1,500.00, and the target rate 148 may be $1,644.39. This indicates that the spot buyer has underpaid (received a bargain) for the analyzed ad placement 26. The spot buyer may use this valuable insight and information to justify purchasing spots for additional airings of the analyzed ad placement 26. As the in-process period 40 continues, the target rate 148 will fluctuate (increasing or decreasing) depending on changes in the primary index metrics 151. By frequently or periodically reviewing the target rate 148, the system user can gather information that is useful to steer and adjust the ad placement 26 during the in-process period 40.

The target rate metric 146 represents or indicates a rate differential that includes, is based on or is equal to the difference between the actual rate 28 and the target rate 148. In an embodiment, the target rate metric 146 is expressed in the form of a percentage of the difference between the dollar amounts of the actual rate 28 and target rate 148. This percentage difference can be indicated with a positive percentage and red color (e.g., +X % in red text), indicating the actual rate 28 is X % greater than the target rate 148. Alternatively, the percentage difference can be indicated with a negative percentage and green color (e.g., −Y % in green text), indicating the actual rate 28 is Y % less than the target rate 28. As the in-process period 40 continues, the target rate metric 146 will fluctuate (increasing or decreasing) depending on changes in the actual rate 28 and target rate 148. As the in-process period 40 continues, the target rate metric 146 will fluctuate (increasing or decreasing) depending on changes in the primary index metrics 151. By frequently or periodically reviewing the target rate metric 146, the system user can gather information that is useful to steer and adjust the ad placement 26 during the in-process period 40.

In an embodiment, the system user can provide or input a plurality of different weight parameters 118, as shown in FIG. 7. The system user can establish or set the weight parameters 118 based on predetermined criteria or instructions or based on input provided by the relevant spot buyer. In an embodiment, the feedback system 10 includes a plurality of weight data fields, each of which corresponds to one of the primary index metrics 151. The system user can fill such data fields with different weight parameters 118. The feedback system 10 applies each weight parameter 118 to the associated primary index metric 151.

In an example, of all of the primary index metrics 151, a spot buyer may find the audience response of highest importance, followed by the audience quality as second-highest importance. Accordingly, the system user can set all of the weight parameters 118 for all of the primary index metrics 151 to a multiplier value of one except for setting: (a) a multiplier value of three for the response cost metric 134; and (b) a multiplier value of two for the audience quality metric 124. Depending on the variable weight parameters 118, the feedback system 10 is operable to determine and generate the target rate 148. This enables the spot buyer to customize and tailor the target rate 148 (and the resulting target rate metric 146) to align with the spot buyer's unique advertising preferences and objectives.

In an embodiment, as shown in FIG. 9, the index metrics 120 include a spend metric 250. The spend metric 250 represents or indicates the change in the amount spent on the analyzed ad placement 26 over a designated time segment of the in-process period 40. In an example, the spend metric 250 is expressed in the form of a percentage representing the percentage difference between the recent spend amount (e.g., the amount spent for the most recent time segment) and a historical spend amount (e.g., the amount spent for a selected time segment preceding the most recent time segment). This percentage difference can be indicated with a positive percentage (e.g., +X %), indicating the recent spend amount is X % greater than the historical spend amount. Alternatively, the percentage difference can be indicated with a negative percentage (e.g., −Y %), indicating the recent spend amount is Y % less than the historical spend amount.

As illustrated in FIG. 3, the output generator 74 is executable to generate visual, audio or audiovisual output by output devices that are operatively coupled to the processors 66. This output, which can include a set of graphical user interfaces (GUIs), includes the feedback 12, enabling system users to receive, access, analyze, interact with, download and distribute the feedback 12.

As shown in FIGS. 10-17, in an embodiment, the output generator 74 is executable by the processors 66 to generate a GUI set 251. The GUI set 251 includes an interactive campaign GUI 252 that is activated by clicking the campaign tab 254. As shown, the campaign tab 254 is adjacent to the placements tab 256 for the interactive placements GUI 258 (described below), which is adjacent to the optimizer tab 260 for the interactive optimizer GUI 262, described below. As described in detail below, the processors 66 generate feedback 12 at an initial level of detail within the campaign GUI 252, at a greater level of detail within the placements GUI 258, and at an even greater level of detail within the optimizer GUI 262.

Figure 11:
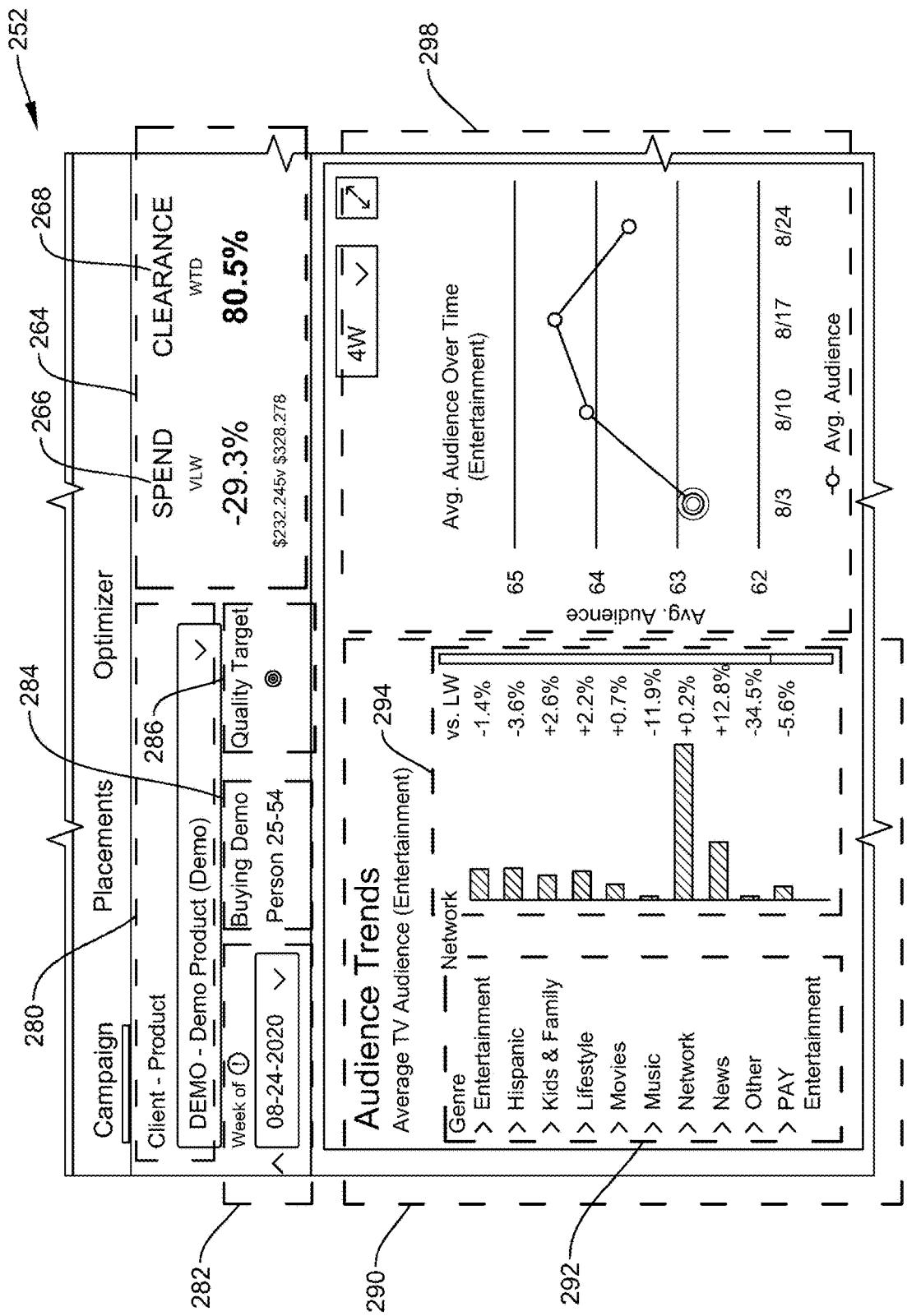
FIG. 11 is an enlarged, top view of first portions of the interactive campaign GUI of FIG. 10.
Figure 12:
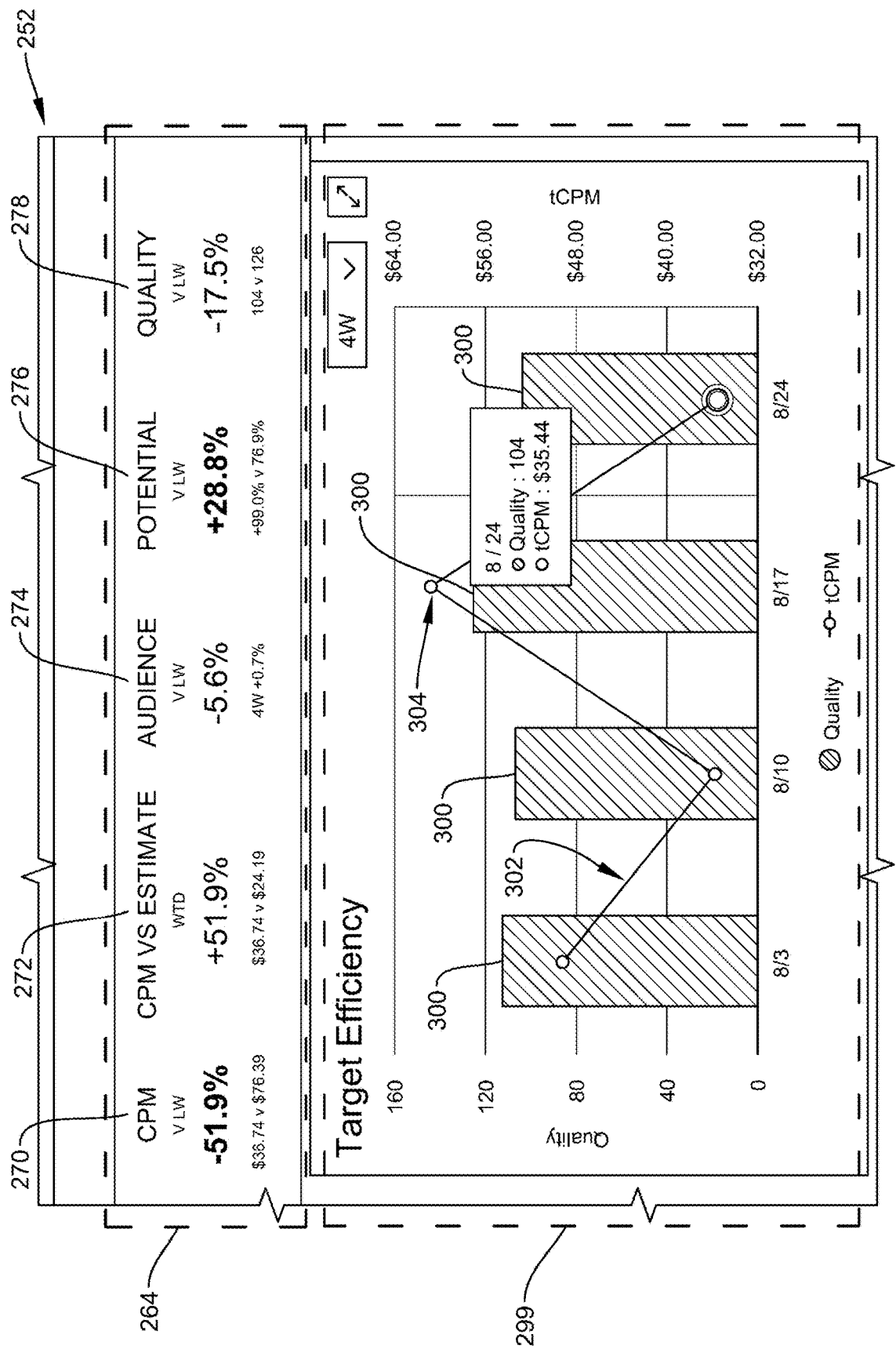
FIG. 12 is an enlarged, top view of second portions of the interactive campaign GUI of FIG. 10.

As shown in FIGS. 11-12, the campaign GUI 252 is structured to include an index summary section 264 having: (a) a spend metric 266 (labeled as SPEND), indicating, in this example, −29.3%, which represents that percentage decrease in the spend amount based on comparing the most recent week's spend amount ($232,245) to the spend amount ($328,278) of the historical week immediately preceding such week; (b) a clearance success metric 268 (labeled as CLEARANCE), indicating, in this example, 80.5%, which indicates that 80.5% of the booked airings of the analyzed ad placement 26 have been cleared by the applicable media provider 16 so far; (c) a buying CPM metric 270 (labeled as CPM), indicating, in this example, −51.9%, which represents the percentage decrease in the CPM based on comparing the most recent week's CPM ($36.74) to the CPM ($76.39) of the historical week immediately preceding such week; (d) a comparative CPM metric 272 (labeled as CPM VS ESTIMATE), indicating, in this example, $+51.9%, which represents the percentage decrease in the CPM based on comparing the most recent week's CPM ($36.74) to the targeted or estimated CPM ($24.19) designated by the spot buyer; (e) an audience level metric 274 (labeled as AUDIENCE), indicating, in this example, −5.6%, which represents the percentage decrease in the audience level based on comparing the most recent week's audience level to the audience level of the historical week immediately preceding such week; (f) an audience timing metric 276 (labeled as POTENTIAL), indicating, in this example, +28.8%, which represents the percentage increase in the audience timing score based on comparing the most recent week's audience timing score (99.0%) to the audience timing score (76.9%) of the historical week immediately preceding such week; and (g) an audience quality metric 278 (labeled as QUALITY), indicating, in this example, −17.5%, which represents the percentage decrease in the audience quality score based on comparing the most recent week's audience quality score (one hundred and four) to the audience quality score (one hundred and twenty six) of the historical week immediately preceding such week.

With continued reference to FIG. 11, the campaign GUI 252 is structured to include: (a) a reference data selector 280 enabling the system user to select a desired reference dataset that is derived from the reference data storage apparatus 46 (shown in FIG. 1); (b) a week selector 282 enabling the system user to select a desired week of the past from a pulldown menu, which, in this example, is week 08-24-2020; (c) a demographic indicator 284 that indicates the particular demographic associated with the selected reference dataset, which, in this example, is persons in the age range of 25-54; and (d) a targeted demographic indicator 286 (labeled as Quality Target) that indicates the specifications of the audience targeted by the spot buyer, which, in this example, displays the following popup (not shown in the figures) when hovering over the targeted demographic indicator 286: "Persons 25-54, 35-54, HHI $100K+, Bachelor Degree+, Exercise Regularly," wherein HHI stands for household income.

The campaign GUI 252 is also structured to include: (a) an audience trends section 290 having: (i) a list of selectable genres 292 (indicating, in this example, the selection of the Entertainment genre); (ii) a plurality of audience level indicators 294, each of which is aligned and associated with one of the genres 292; and (iii) a plurality of audience level change indicators 296, each of which is aligned and associated with one of the genres 292 and each of which indicates the change in the most recent week's audience level compared to the previous week's audience level; and (b) an audience level chart 298, indicating, in this example, the ad placement's experience of a rising and falling audience level in the selected entertainment genre from Aug. 3, 2020 to Aug. 24, 2020.

As shown in FIG. 12, the campaign GUI 252 is also structured to include a target efficiency chart 299. In this example, the quality bars 300 indicate the audience quality scores (varying against the left Y axis) over the time period from Aug. 3, 2020 to Aug. 24, 2020, and each vertex dot of the quality CPM line 302 indicates the quality-adjusted CPM metric (varying against the right Y axis). Upon hovering over the vertex dots, such as vertex dot 304, the GUI 252 displays a popup, indicating, in this example, the quality score of one hundred and four and the quality-adjusted CPM metric of $35.44 on Aug. 24, 2020.

Figure 13:
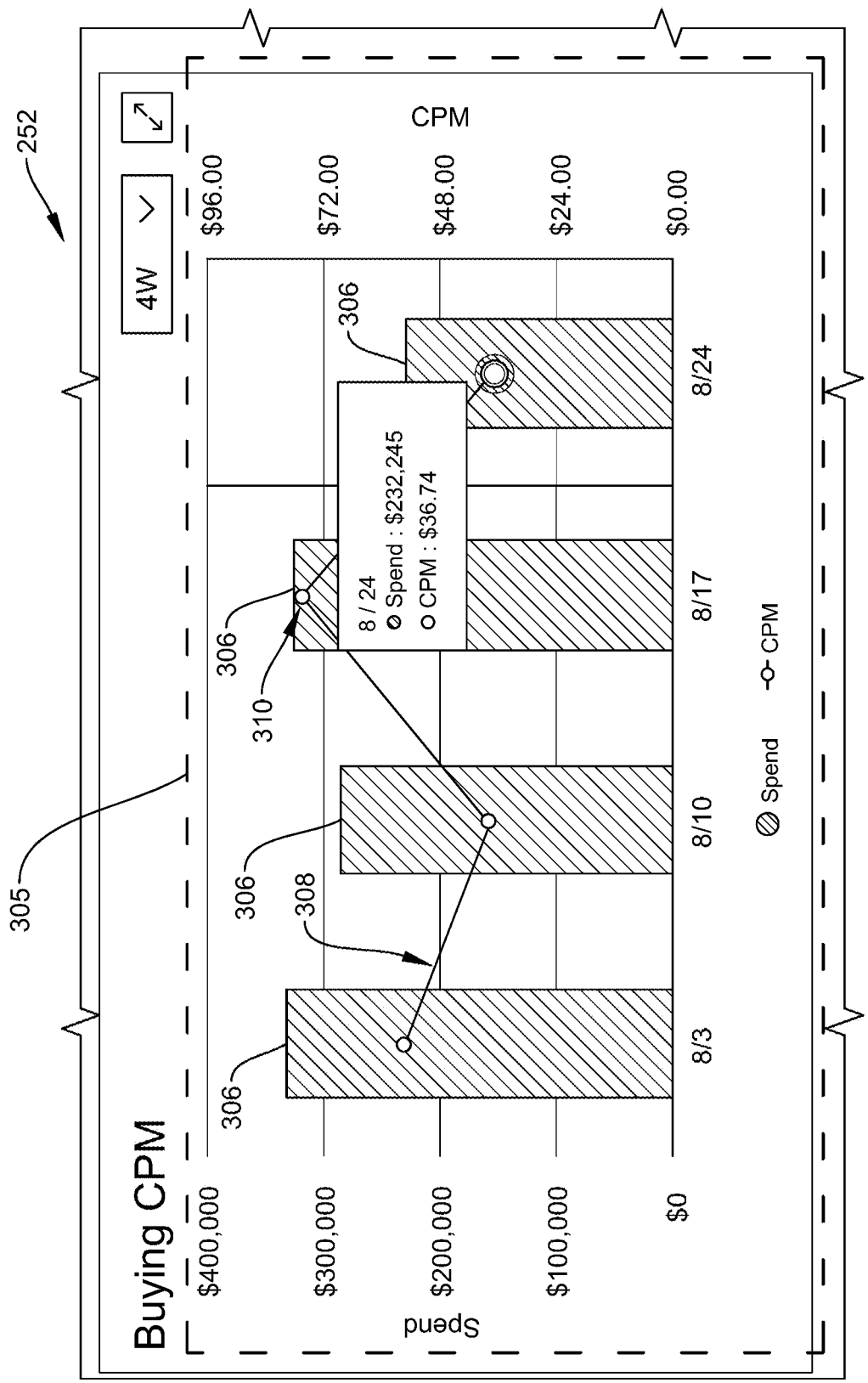
FIG. 13 is an enlarged, top view of third portions of the interactive campaign GUI of FIG. 10.

As shown in FIG. 13, the campaign GUI 252 is also structured to include a buying CPM chart 305. In this example, the spend bars 306 indicate the spend amounts (varying against the left Y axis) over the time period from Aug. 3, 2020 to Aug. 24, 2020, and each vertex dot of the CPM line 308 indicates the CPM (varying against the right Y axis). Upon hovering over the vertex dots, such as vertex dot 310, the campaign GUI 252 displays a popup, indicating, in this example, the spend amount of $232,245 and the CPM of $36.74 on Aug. 24, 2020.

Figure 14:
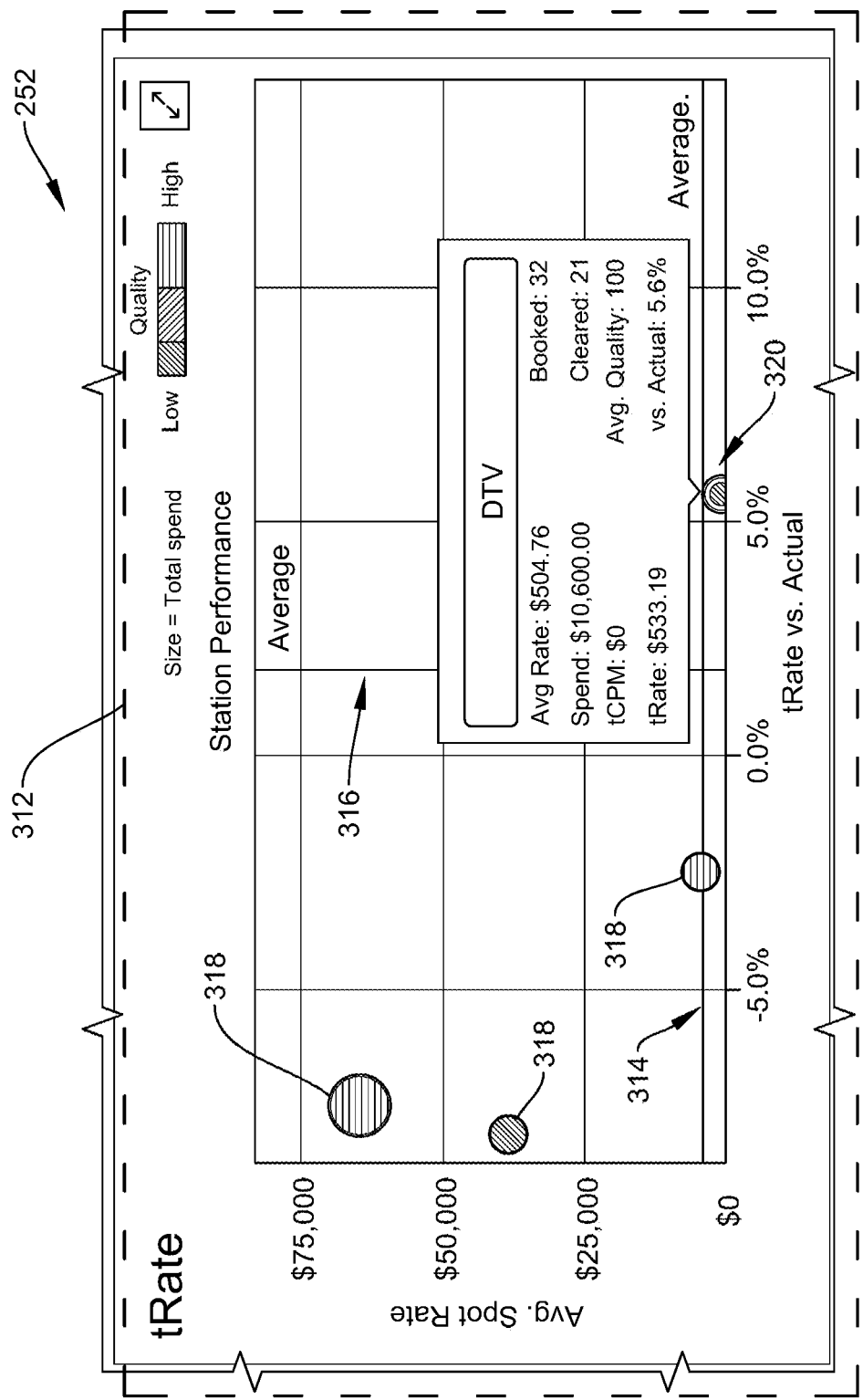
FIG. 14 is an enlarged, top view of fourth portions of the interactive campaign GUI of FIG. 10.

As shown in FIG. 14, the campaign GUI 252 is also structured to include a station performance chart 312. In this example, the Y axis provides a measure of the actual rate of the ad placement 26. The X axis provides a measure of the percentage difference between the actual rate and the target rate. The horizontal average line 314 indicates the average actual rate, and the vertical average line 316 indicates the average percentage difference. The TV station dots 318 indicate the plot locations associated with the launched ad 42 aired by a plurality of different TV stations. Upon hovering over the TV station dots 318, such as TV station dot 320, the GUI 252 displays a popup, indicating, in this example, the TV station, DTV, the average actual rate of $504.76, the spend amount of $10,600.00, the quality-adjusted CPM metric of $0, the target rate of $533.19, the ad booked quantity of thirty two, the ad cleared quantity of twenty one, the average audience quality score of one hundred, and 5.6% representing that the percentage increase of the actual rate compared to the target rate.

Figure 15:
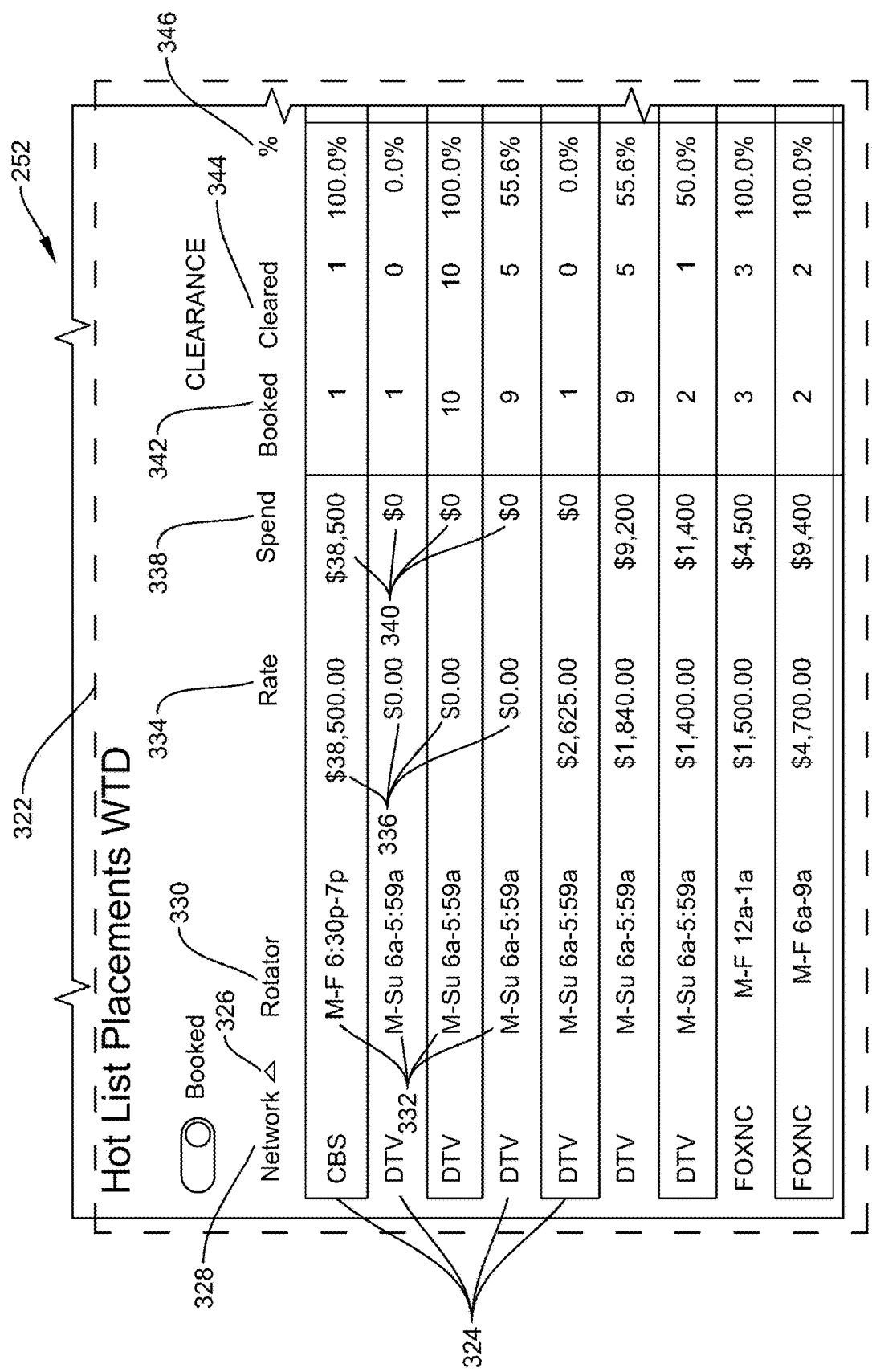
FIG. 15 is an enlarged, top view of fifth portions of the interactive campaign GUI of FIG. 10.
Figure 16:
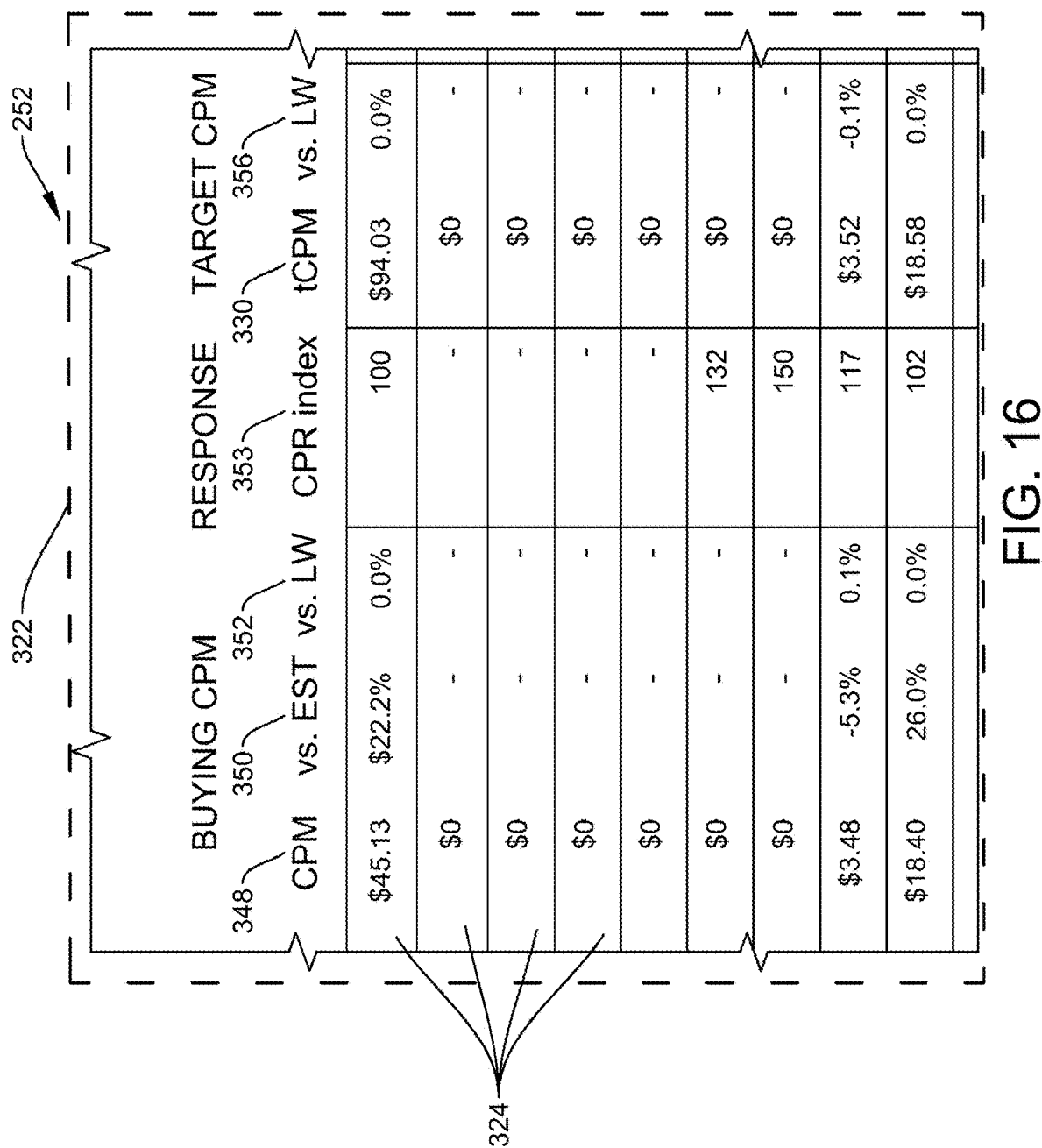
FIG. 16 is an enlarged, top view of sixth portions of the interactive campaign GUI of FIG. 10.
Figure 17:
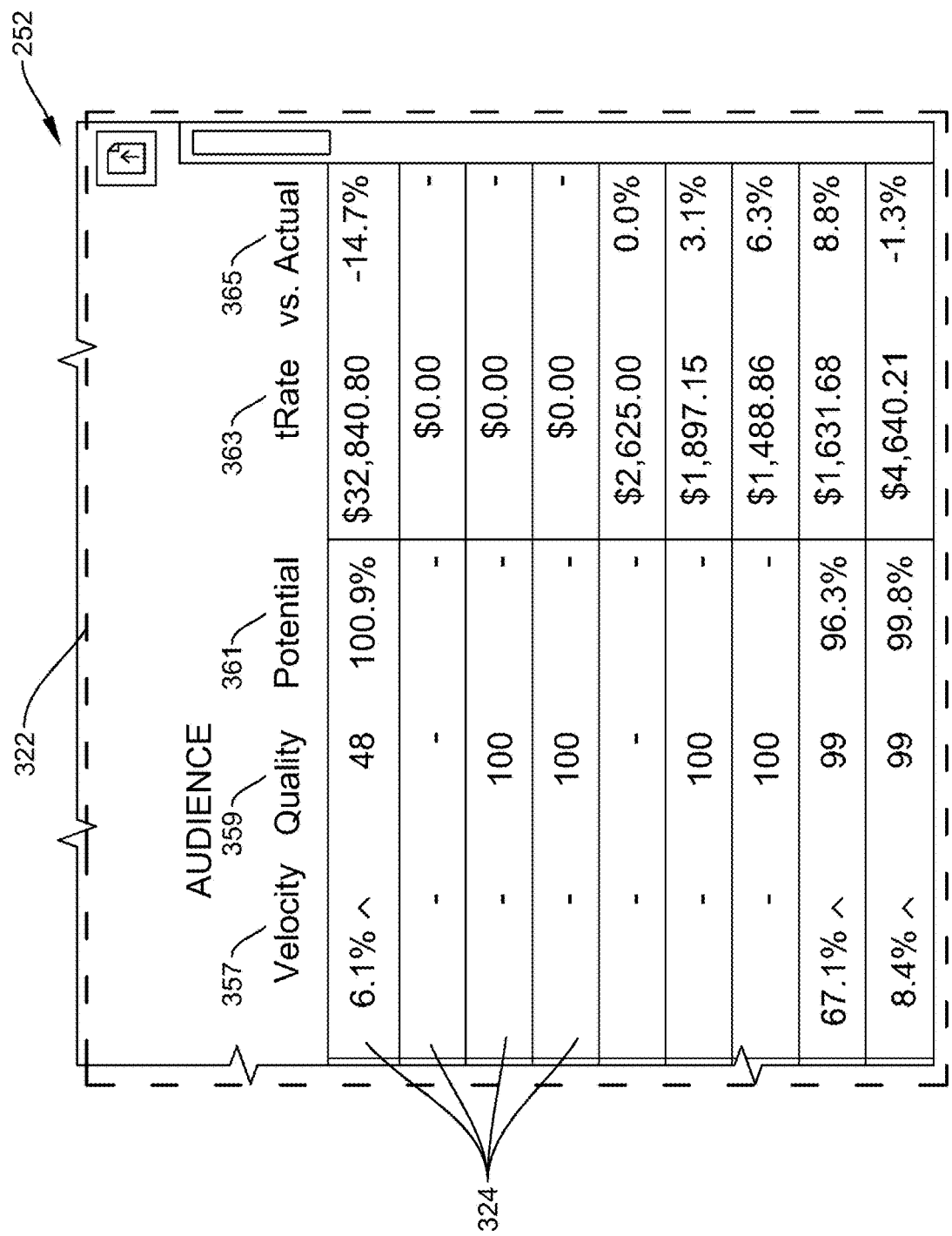
FIG. 17 is an enlarged, top view of seventh portions of the interactive campaign GUI of FIG. 10.

Referring to FIG. 15-17, the campaign GUI 252 is also structured to include a campaign dashboard 322 for all of the ad placements 324 of the relevant advertising campaign. In the example shown, the campaign dashboard 322 includes a table having a plurality of rows, each of which specifies an ad placement 324. Each of the ad placements 324 is a separate buyline item of the advertising campaign. The campaign dashboard 322 also includes: (a) a TV network pulldown menu 326 enabling the system user to select and fill the TV network column 328 with the identifiers of desired TV networks; (b) a rotator column 330 enabling the system user to select and specify time schedules 332 (e.g., recurring sets of days with specified airing time windows) for the ad placements 324; (c) an actual rate column 334, enabling the system user to visualize the actual rates 336 in place for the ad placements 324; (d) a spend column 338, enabling the system user to visualize the spend amounts 340 for the ad placements 324; (e) a booked column 342, enabling the system user to visualize, with respect to each of the ad placements 324, the quantity of times such ad placement 324 has been booked; (f) a cleared column 344, enabling the system user to visualize, with respect to each of the ad placements 324, the quantity of times such ad placement 324 has been cleared; (g) a clearance success column 346, enabling the system user to visualize, with respect to each of the ad placements 324, the percentage of bookings that have cleared; (h) a buying CPM column 348, enabling the system user to visualize the CPMs for the ad placements 324; (i) a buying CPM estimate comparator column 350, indicating the percentage difference (positive or negative) between the actual CPM and the estimated or targeted CPM specified by the spot buyer for the ad placements 324; (j) a buying CPM history comparator column 352, indicating the percentage difference (positive or negative) between the most recent week's CPM of the ad placements 324 to the CPM of the ad placements 324 for the historical week immediately preceding such week; (k) a response cost metric column 353, indicating, for each of the ad placements 324, the response cost score, which is variable relative to threshold score of one hundred; (l) a quality-adjusted CPM column 354, indicating the quality-adjusted CPM value for the ad placements 342; (m) a comparative quality-adjusted CPM column 356, indicating, for each of the ad placements 342, the percentage difference between the quality-adjusted CPM value of the most recent week and the quality-adjusted CPM value of the historical week preceding such week; (n) an audience change column 357 indicating, with respect to each of the ad placements 342, the percentage change of the most recent week's audience quality score to the audience quality score of the historical week immediately preceding such week; (o) an audience quality score column 359 indicating, with respect to each of the ad placements 342, the quality score of the most recent week's audience quality; (p) an audience timing metric column 361 indicating, with respect to each of the ad placements 342, the audience timing percentage, which can deviate relative to a threshold of 100% associated with an average audience level; (q) a target rate column 363 indicating the fair, justifiable or target rates for the ad placements 342; and (r) a target rate metric column 365 indicating, for each of the ad placements 342, the percentage difference (positive or negative) between the dollar amounts of the ad placement's actual rate and target rate.

Figures 18, 18A, 18B:
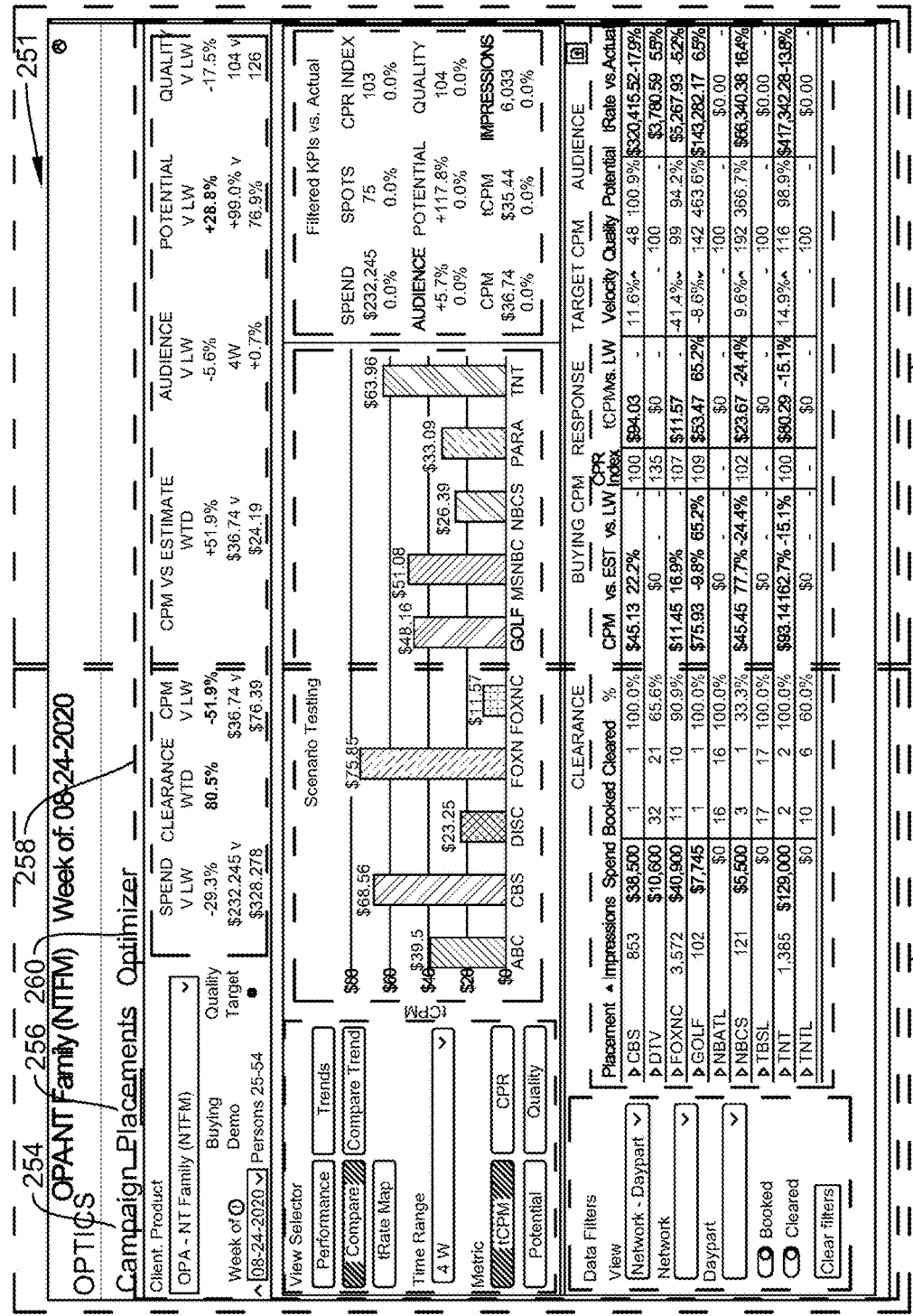
FIG. 18 is a top view of an example of an embodiment of a GUI set generated by the feedback system, illustrating an example of an embodiment of an interactive placements GUI generated by the feedback system.
FIG. 18A is an enlarged, top view of the left part of the GUI of FIG. 18.
FIG. 18B is an enlarged, top view of the right part of the GUI of FIG. 18.
Figure 18A:
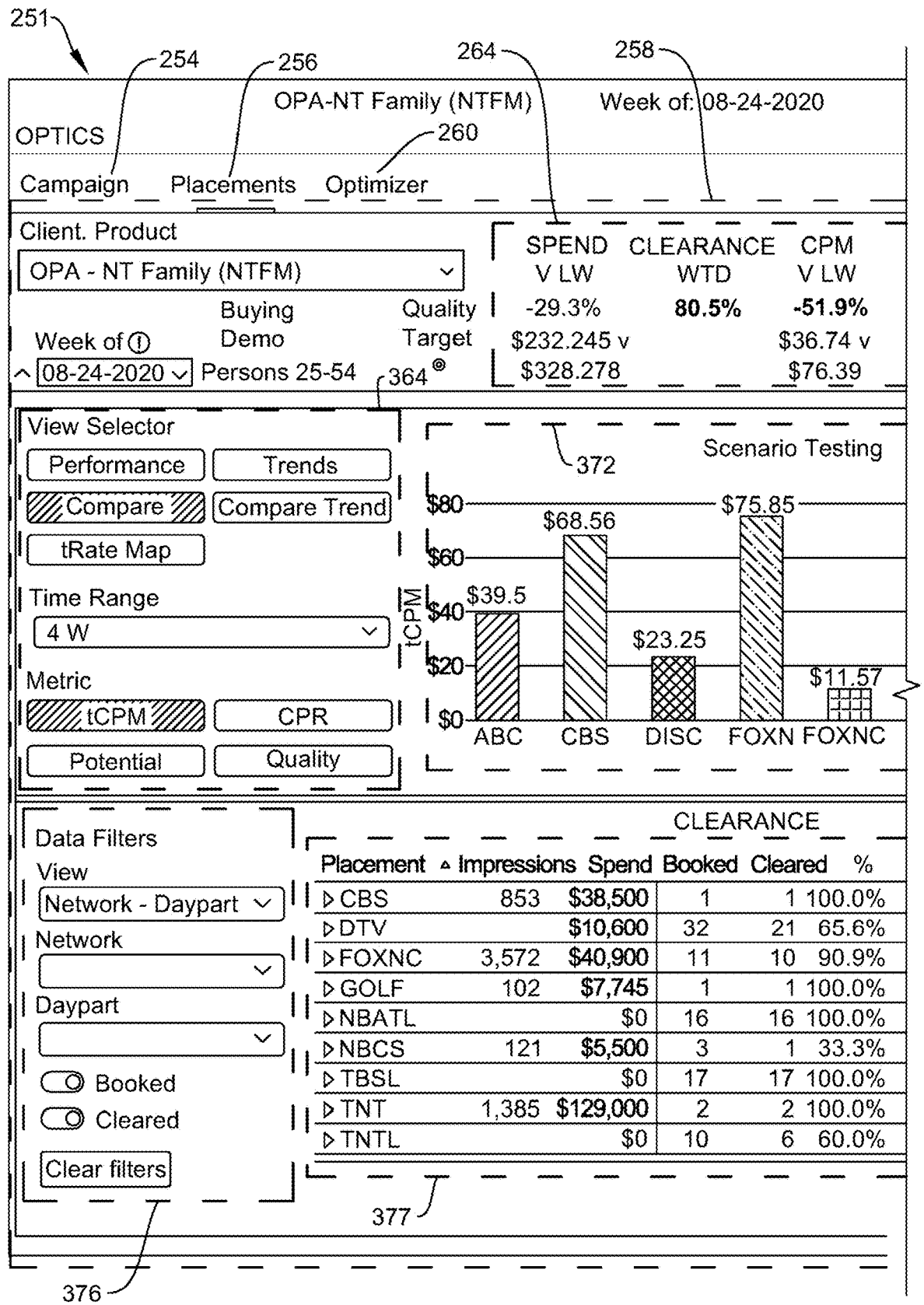

As shown in FIG. 18, the placements GUI 258 is structured to include certain elements, structure and functions of the campaign GUI 252. In addition, as shown in FIGS. 18-23, the placements GUI 258 is structured to include: (a) a view selector section 364 having a plurality of selectable view settings 366, including, in this example, Performance, Compare, tRate Map (identifying target rate map), Trends and Compare Trend view settings; (b) a time range selector 368, providing a pulldown menu enabling the system user to select a desired time range from a list of time ranges; (c) a metric management section 370 having a plurality of metric settings, including, in this example, the following metric settings: tCPM (identifying target CPM), Potential (identifying audience timing metric), CPR, and Quality (identifying audience quality score); (d) a scenario testing section 372; (e) a key indicators section 374; (f) a data filters section 376; and (g) a placement dashboard 377.

Figure 19:
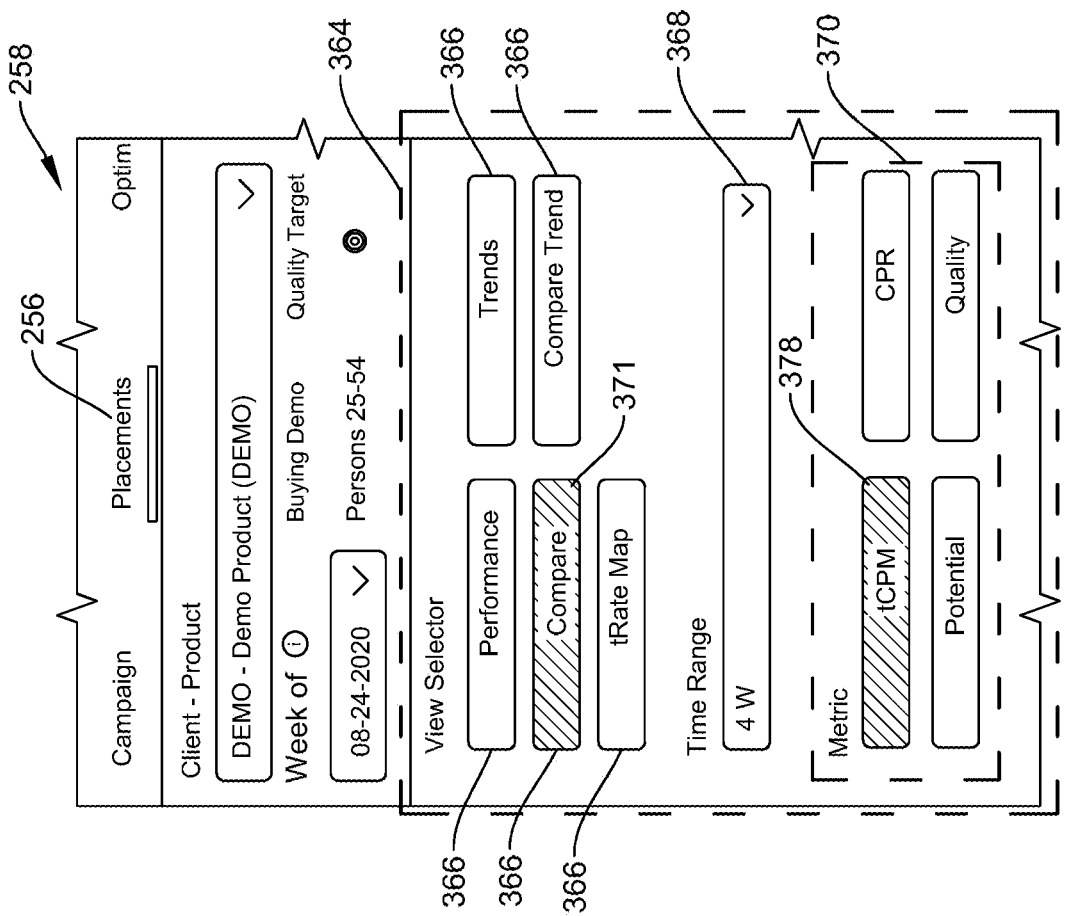
FIG. 19 is an enlarged, top view of first portions of the interactive placements GUI of FIG. 18.

Referring to FIG. 19, in operation, the feedback system 10 receives the setting inputs made by the system user within the view selector section 364 and metric management section 370. Depending on these inputs, the feedback system 10 causes the placements GUI 258 to filter and generate outputs in the scenario testing section 372 and key indicators section 374.

Figure 20:
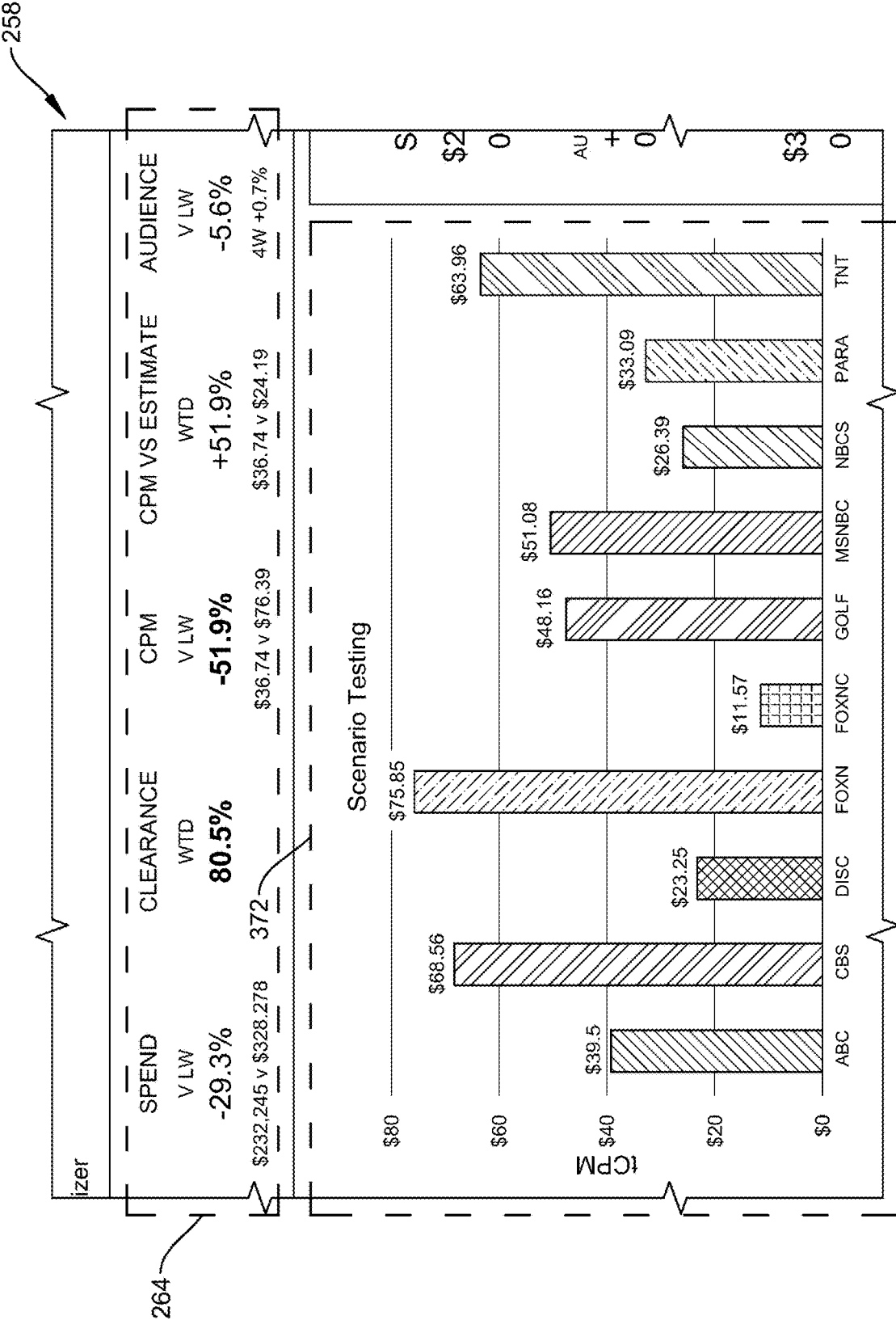
FIG. 20 is an enlarged, top view of second portions of the interactive placements GUI of FIG. 18.

As shown in FIG. 20, the scenario testing section 372 includes a chart that provides a graph, map or other visuals that indicate data based on the setting inputs made by the system user within the view selector section 364 and metric management section 370. In the example shown, the system user selected the Compare setting 371 and the tCPM setting 378, as shown in FIG. 19. Accordingly, the scenario testing section 372 displays a chart having a measure of target CPM on the Y axis and a plurality of different TV stations on the X axis. For each such station, the scenario testing section 372 displays an actual CPM bar representing the actual CPM associated with such TV station.

Figure 21:
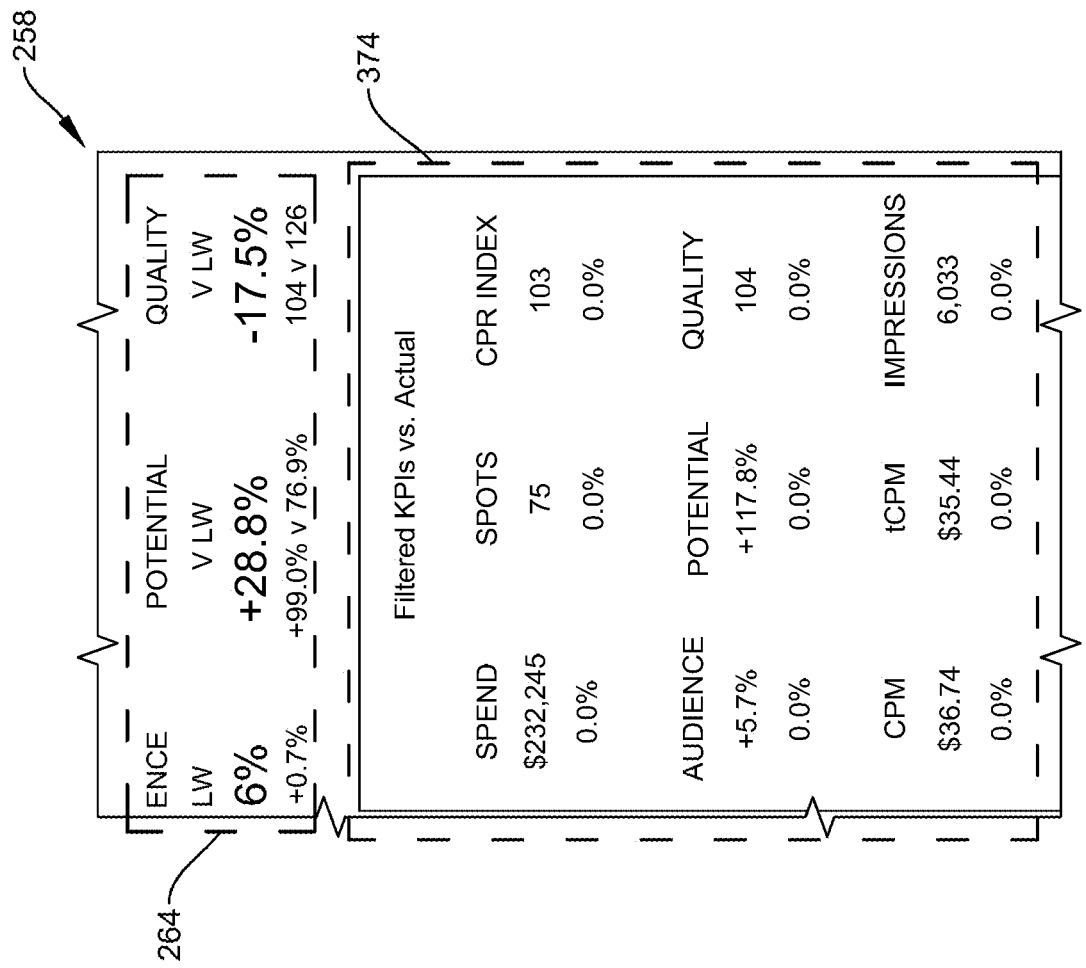
FIG. 21 is an enlarged, top view of third portions of the interactive placements GUI of FIG. 18.

As shown in FIG. 21, the key indicators section 374 displays, in the example shown, a plurality of filtered key indicators, including: (a) a spend metric (labeled as SPEND) indicating the amount spent; (b) a spots metric (labeled as SPOTS) indicating the quantity of ad spots in which the ad aired; (c) a response cost metric (labeled as CPR INDEX); (d) an audience quality metric (labeled as AUDIENCE); (e) an audience timing metric (labeled as POTENTIAL); (f) a CPM metric (labeled as CPM); (g) a quality-adjusted CPM value (labeled as tCPM); and (h) an impressions count metric (labeled as IMPRESSIONS).

Figure 22:
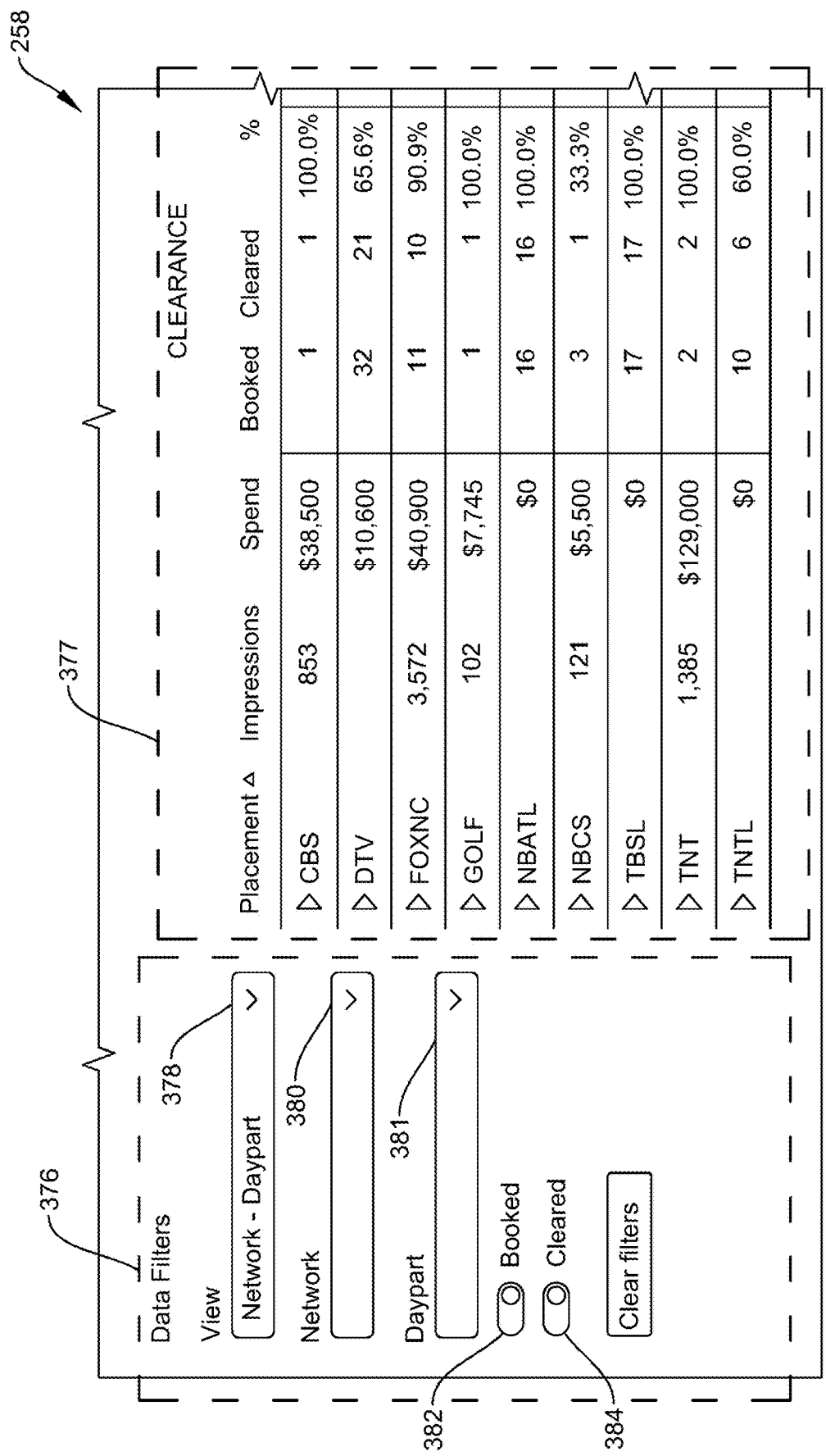
FIG. 22 is an enlarged, top view of fourth portions of the interactive placements GUI of FIG. 18.

As shown in FIG. 22, the data filters section 376 is operatively coupled to the placement dashboard 377. The data filters section 376 includes a view selector 378 which has a pulldown menu for selecting a desired view setting from a plurality of settings, including Network-Daypart, Network-Length, Daypart-Length, Daypart-Network, Length-Network, and Length-Daypart. The data filters section 376 also includes a TV network selector 380 having a pulldown menu for selecting one or more desired TV networks from a list of different TV networks, such as ABC, BRVO, CBS, CNN, DISC, ESPN, FOXN, HGTV, NBC, TNT and other TV networks. In addition, the data filters section 376 includes: (a) a daypart selector 381; (b) a booked toggle switch 382 which, depending on its right or left position, limits the data in the campaign dashboard 322 to booked ad placements 324; and (c) a cleared toggle switch 384 which, depending on its right or left position, limits the data in the placement dashboard 377 to cleared ad placements 324. Depending on the selections input by the system user through the data filters section 376, the feedback system 10 customizes (e.g., filters or limits) the data displayed in the placement dashboard 377.

In an embodiment, a plurality of the data pieces in the placement dashboard 377 include links or interactive elements. As shown in FIG. 23, when the system user hovers over or clicks one of these data pieces, the placement dashboard 377 displays a popup 388 that, in turn, displays detailed data that underlies or relates to such data piece.

Figures 24, 24A, 24B:
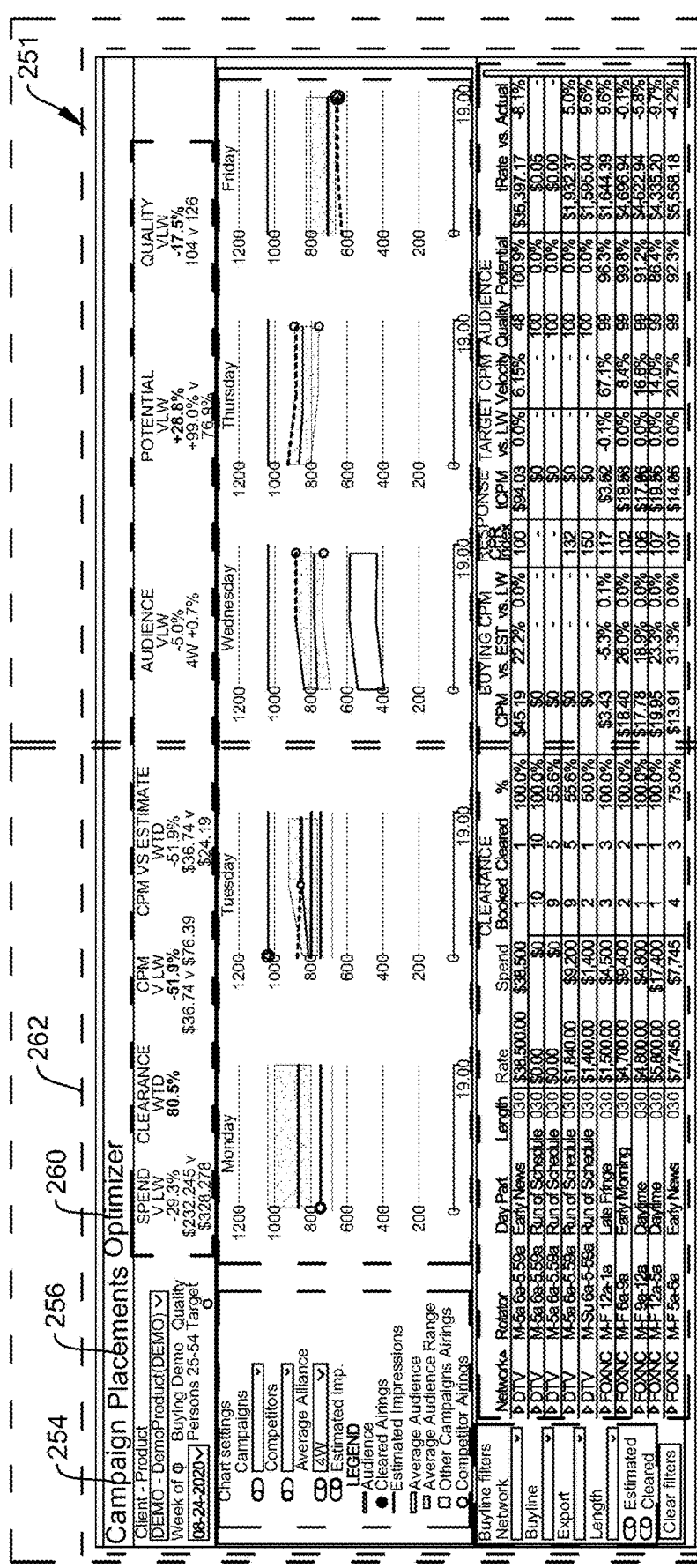
FIG. 24 is a top view of an example of an embodiment of a GUI set generated by the feedback system, illustrating an example of an embodiment of an interactive optimizer GUI generated by the feedback system.
FIG. 24A is an enlarged, top view of the left part of the GUI of FIG. 24.
FIG. 24B is an enlarged, top view of the right part of the GUI of FIG. 24.
Figure 24A:
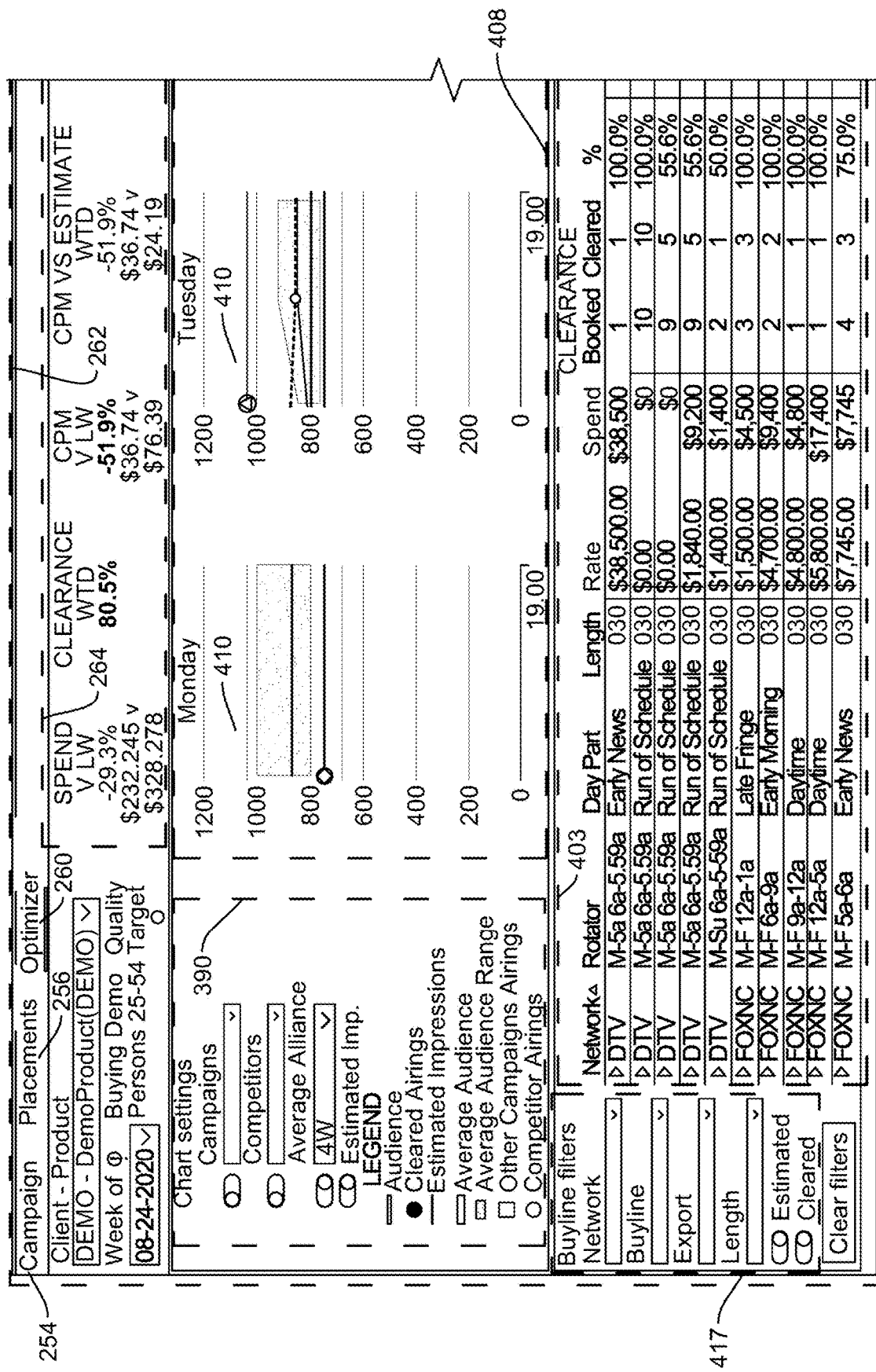
Figure 24B:
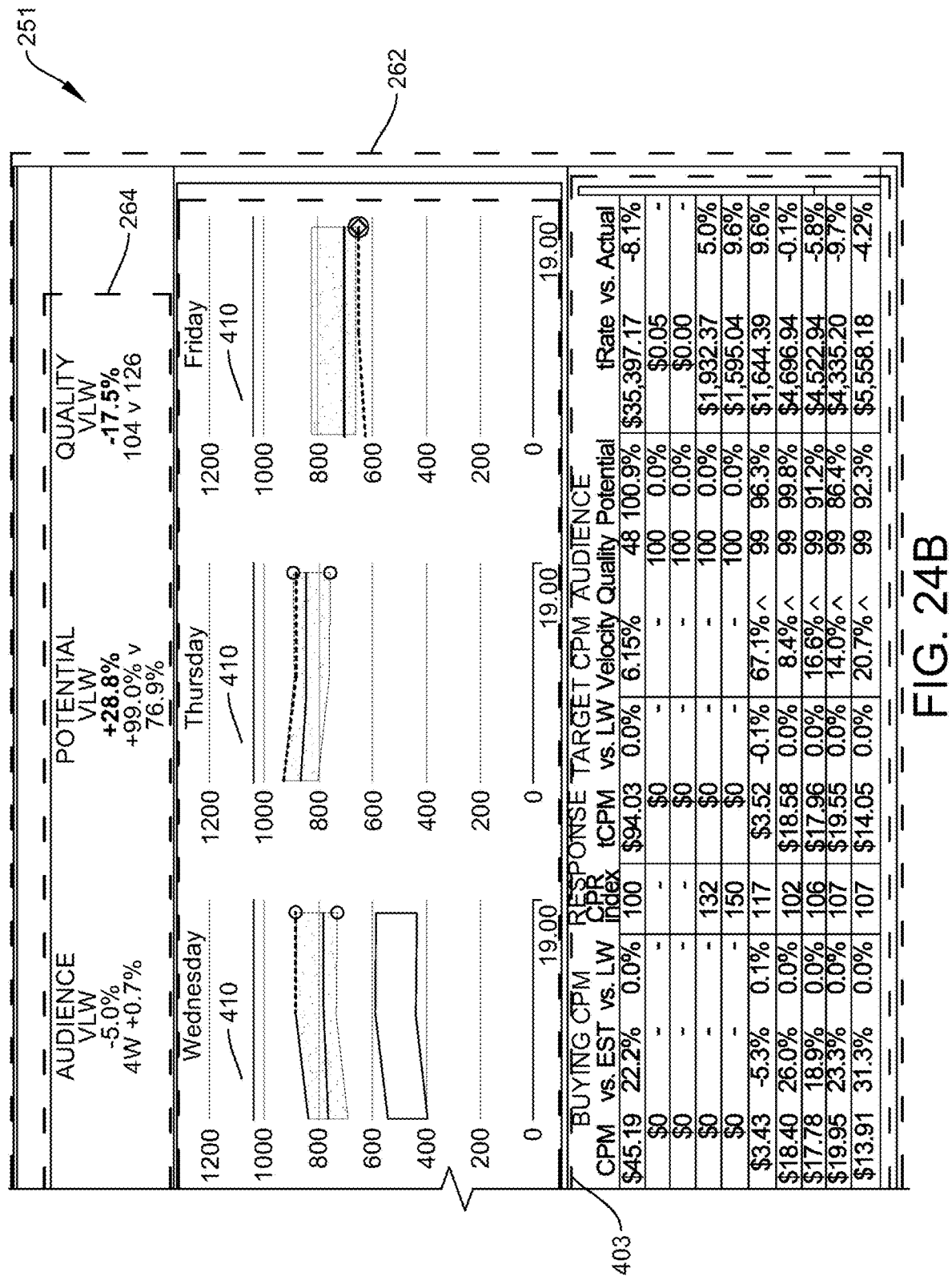
Figure 25:
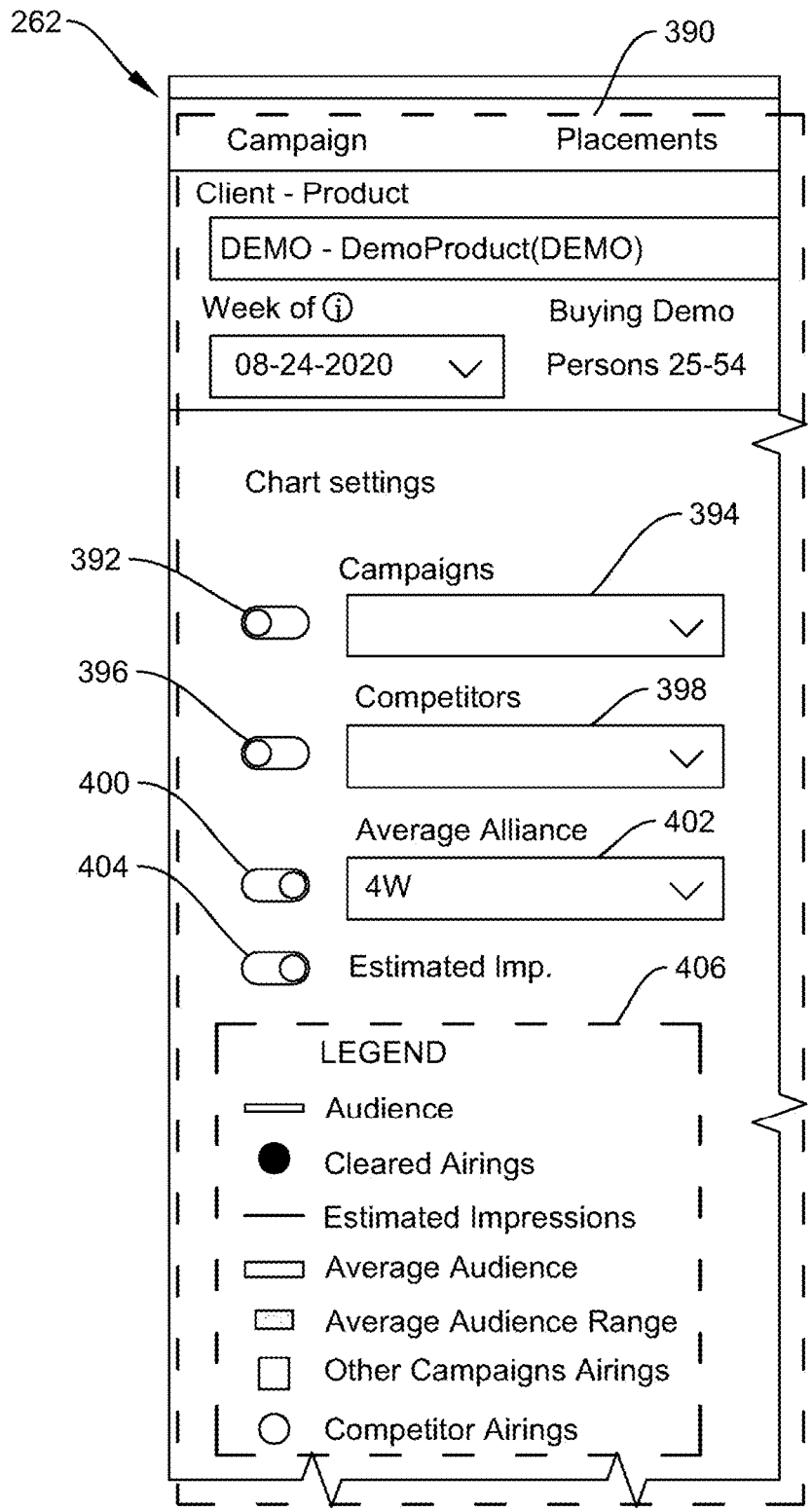
FIG. 25 is an enlarged, top view of first portions of the interactive optimizer GUI of FIG. 24.
Figure 26:
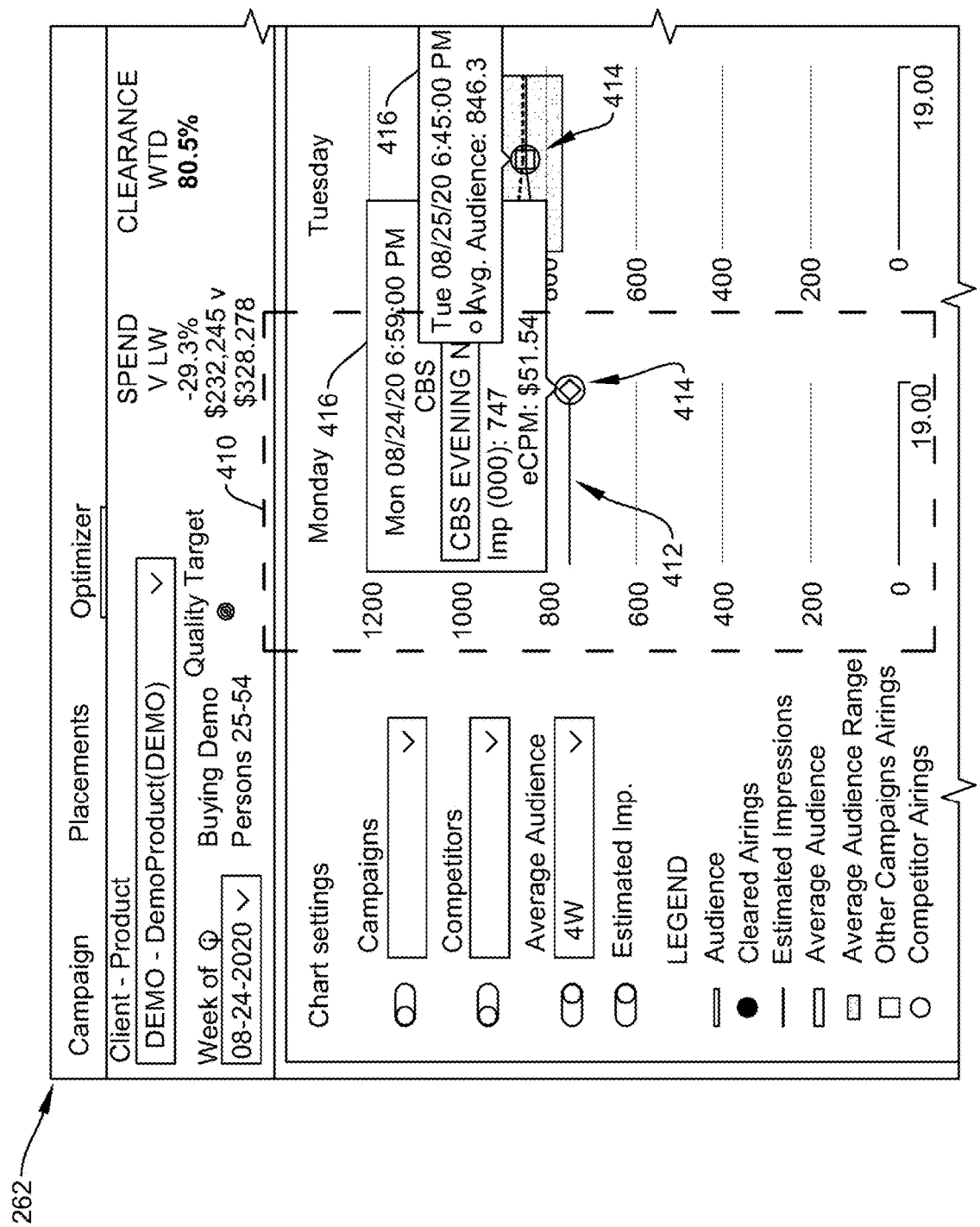
FIG. 26 is an enlarged, top view of second portions of the interactive optimizer GUI of FIG. 24.

As shown in FIG. 24, the optimizer GUI 262 is structured to include certain elements, structure and functions of the campaign GUI 252. In addition, as shown in FIGS. 25-26, the optimizer GUI 262 is structured to include: (a) a chart setting section 390 having: (i) a campaigns toggle switch 392 which, depending on its right or left position, limits the data in the optimizer GUI 262 to the one or more advertising campaigns selected by the system user through the campaign pulldown menu 394; (ii) a competitors toggle switch 396 which, depending on its right or left position, limits the data in the optimizer GUI 262 to the one or more competitors selected by the system user through the competitor pulldown menu 398; (iii) an average audience toggle switch 400 which, depending on its right or left position, limits the data in the optimizer GUI 262 to the one or more audience time windows selected by the system user through the audience pulldown menu 402; and (iv) an estimated impressions toggle switch 404 which, depending on its right or left position, limits the data in the optimizer GUI 262 to the estimated impressions count designated by the system user; and (b) a legend section 406 that has text describing the chart symbols displayed in the optimizer GUI 262.

Depending on the selections input by the system user through the chart setting section 390, the feedback system 10 customizes (e.g., filters or limits) the data displayed in the optimizer GUI 262. In the example shown, the system user set the average audience toggle switch 400 to the on position (right position), limiting the data in the optimizer GUI 262 to the a four week lookback period, and the system user set the estimated impressions toggle switch 404 to the on position. Based on these settings, the optimizer GUI 262 displays, in the example shown, a chart set 408 of daily impression charts 410 for Monday through Friday, as illustrated in FIG. 24.

Figure 27:
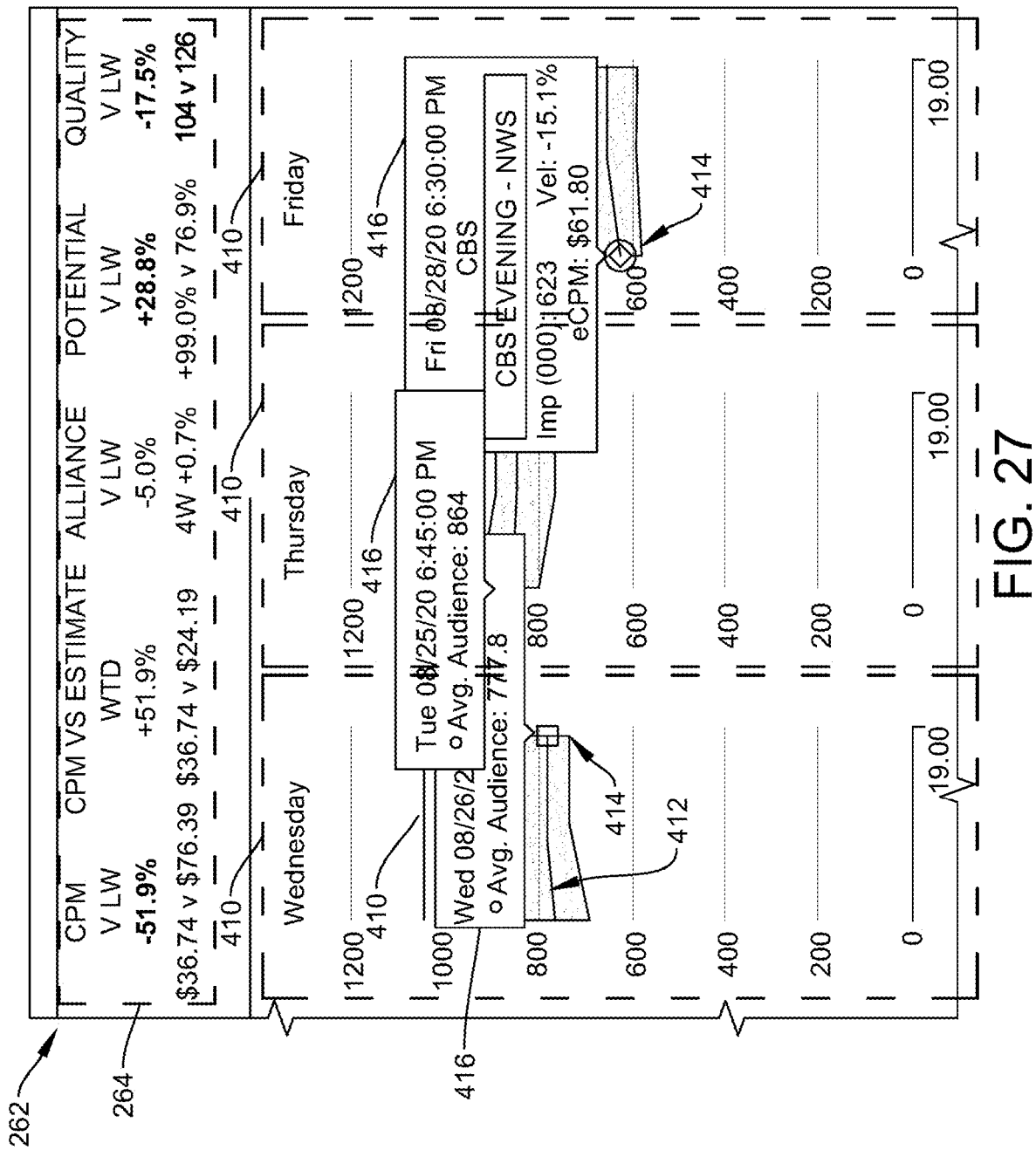
FIG. 27 is an enlarged, top view of third portions of the interactive optimizer GUI of FIG. 24.

Referring to FIG. 26, The Y axis of each daily impression chart 410 provides a measure of the impression count. The X axis of each daily impression chart 410 provides a measure of airing time (e.g., 0 to 19 seconds). Each impression chart 410 has an impression outcome line 412 that indicates the impression count as it varied over the airing time for the relevant day of the week. Each impression outcome line 412 includes a detail symbol 414, such as one of the symbols of the legend section 406. As shown in FIGS. 26-27, when the system user hovers over or clicks detail symbols 414, the optimizer GUI 262 displays popups 416, which display greater, in-depth data related to the advertising campaign, including the relevant TV station, TV program, impression count, estimated CPM, and average audience level.

Figure 29:
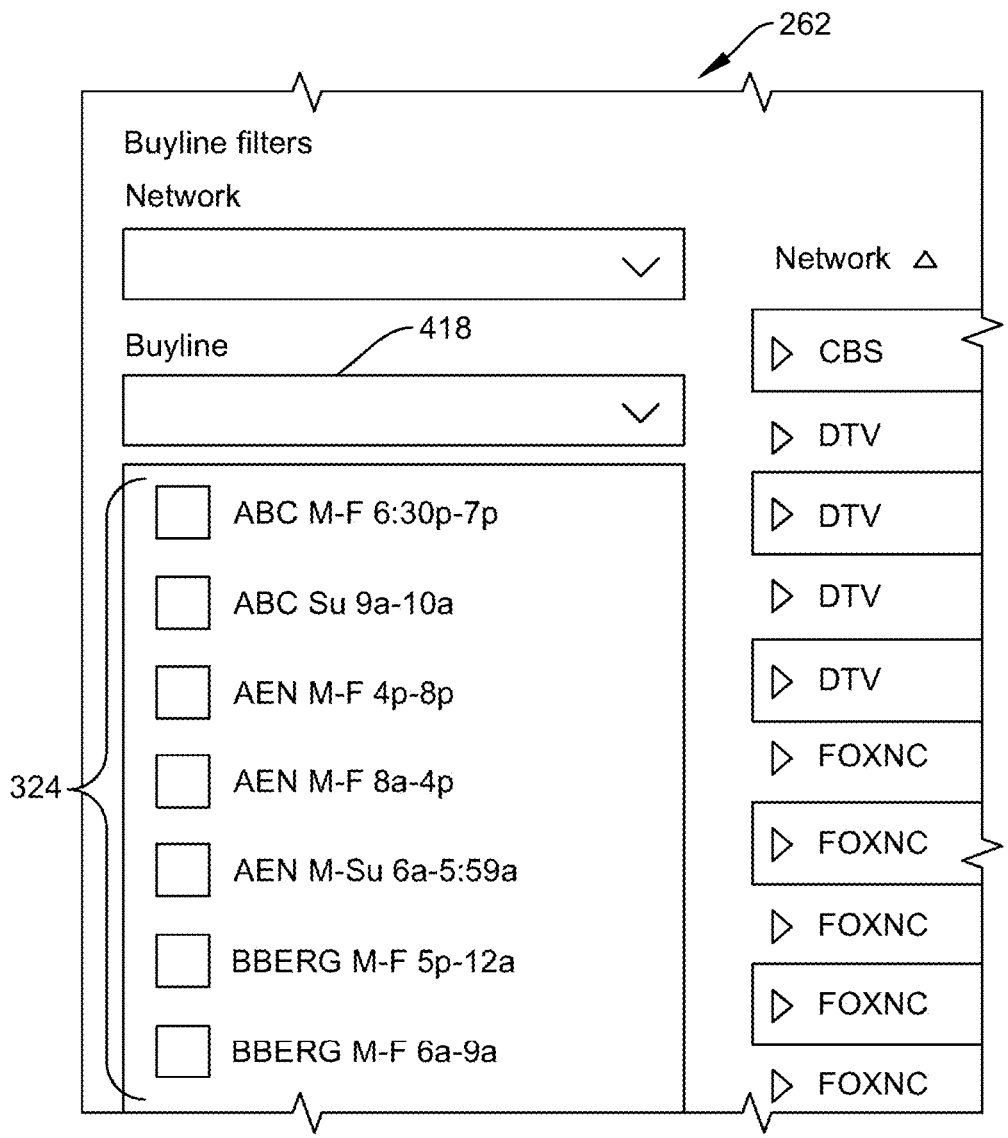
FIG. 29 is an enlarged, top view of fifth portions of the interactive optimizer GUI of FIG. 24.
Figure 30:
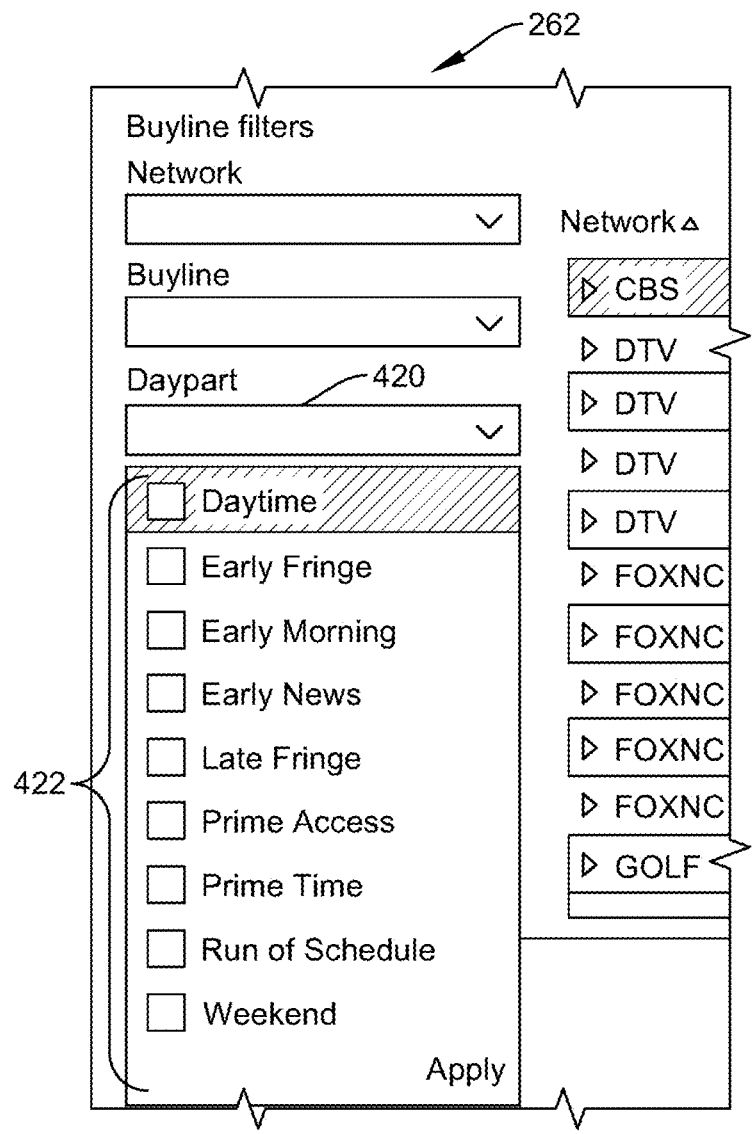
FIG. 30 is an enlarged, top view of sixth portions of the interactive optimizer GUI of FIG. 24.

As shown in FIGS. 28-30, the optimizer GUI 262 includes: (a) a buyline filter section 417 having a buyline selector 418, which includes a buyline pulldown menu enabling the system user to select one or more of the desired ad placements 324; and (b) a daypart selector 420 including a daypart pulldown menu enabling the system user to select one or more of the dayparts 422. As shown in FIG. 28, the optimizer dashboard 403 includes the campaign dashboard 322 as well as a daypart column 424. The daypart column 424 displays the dayparts specified for the ad placements 324. Depending on the selections input by the system user through the buyline selector 418 and daypart selector 420, the feedback system 10 customizes (e.g., filters or limits) the data displayed in the optimizer dashboard 403.

Figure 31:
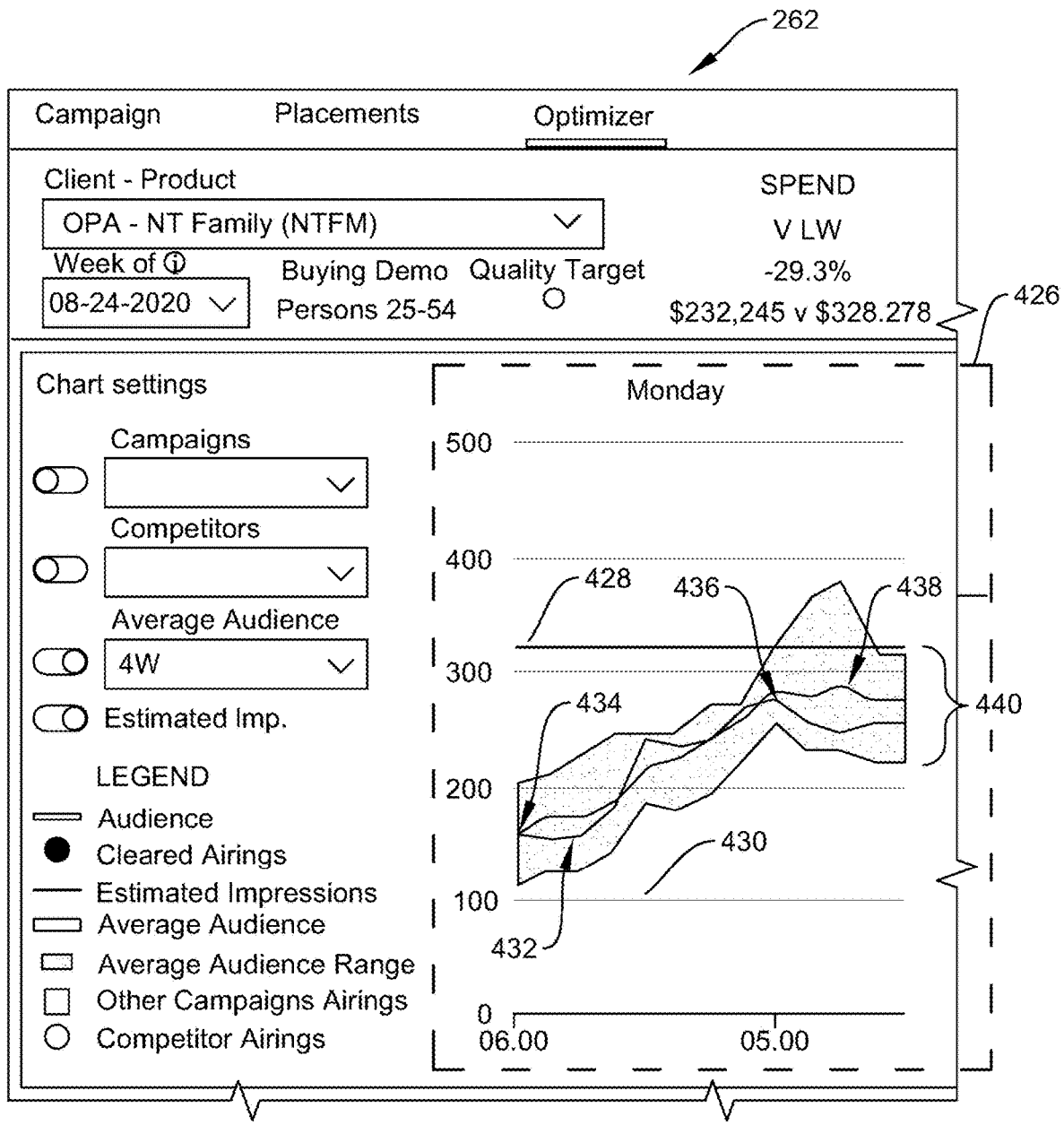
FIG. 31 is an enlarged, top view of seventh portions of the interactive optimizer GUI of FIG. 24.

Referring to FIG. 31, in an embodiment, the optimizer GUI 262 is structured to display a plurality of audience timing charts, each one corresponding to a particular day of the week. In the example shown, the optimizer GUI 262 displays the audience timing chart 426 associated with Monday. The audience timing chart 426 includes: (a) a Y axis having a measure of scores ranging from 0 to 500; (b) an X axis having a measure of airing time, ranging, for example, from 5:00 AM to 11:00 PM; (c) an impression line 428 indicating an estimated impression count for the designated audience; (d) a horizontal threshold audience line 430 at score one hundred, indicating an average audience level; (e) an actual audience line 432 indicating the actual, varying level of the audience that occurred at the different airing time points, indicating, in this example, a relatively low audience level score at the 5:00 AM airing time point 434 (a valley) and a relatively high audience level score at the 5:00 PM airing time point 436 (a peak); (f) an average audience line 438 indicating the average, varying level of the audience that occurred at the different airing time points; and (g) an average audience range 440 indicating the average, varying level of a range of audience demographics that occurred at the different airing time points.

System users, including spot buyers and their contractors and agents, can interact with, review, analyze and download the data visible in the campaign GUI 252, placements GUI 258 and optimizer GUI 262. By performing these activities during the in-process period 40 of the analyzed ad placements 26, the system users can collaborate with the media providers 16 to adjust the specifications of the ad placements 26, such as the purchase data 25. Accordingly, during the in-process period 40, the system users can work with the media provides 16 to continue the airings of the launched ads 42 in accordance with the adjusted specifications. This enables system users to steer and navigate the launched ads 42 during the in-process period 40 to improve the results of the launched ads 42. This also enables spot buyers to experiment, via trial and error, with different specifications and readily assess the effects of the different specifications and make adjustments, all while the launched ads 42 remain in the in-process period.

In an embodiment, the feedback logic 62 and system data 63 are configured and structured to be stored in a database. A processor, such as one of the processors 66, can access such database over any suitable type of network, or the processor can access such database directly if the database and processor are parts of a single server unit (including, but not limited to, system server 70). In addition, network access devices (e.g., media access devices 45) operated by users can access such database over any suitable type of network. Depending upon the embodiment, the network can include one or more of the following: a wired network, a wireless network, a local area network (LAN), an extranet, an intranet, a wide area network (WAN) (including, but not limited to, the Internet), a virtual private network (VPN), an interconnected data path across which multiple devices may communicate, a peer-to-peer network, a telephone network, portions of a telecommunications network for sending data through a variety of different communication protocols, a Bluetooth® communication network, a radio frequency (RF) data communication network, an infrared (IR) data communication network, a satellite communication network or a cellular communication network for sending and receiving data through short messaging service (SMS), multimedia messaging service (MMS), hypertext transfer protocol (HTTP), direct data connection, Wireless Application Protocol (WAP), email or any other suitable message transfer service or format.

In an embodiment, processors 66 can include a data processor or a central processing unit (CPU). The reference data storage apparatus 46, system storage devices 64, system server 70 and webserver 106 can include one or more data storage devices, including, but not limited to, a database, a hard drive with a spinning magnetic disk, a Solid-State Drive (SSD), a floppy disk, an optical disk (including, but not limited to, a CD or DVD), a Random Access Memory (RAM) device, a Read-Only Memory (ROM) device (including, but not limited to, programmable read-only memory (PROM), electrically erasable programmable read-only memory (EPROM), electrically erasable programmable read-only memory (EEPROM)), a magnetic card, an optical card, a flash memory device (including, but not limited to, a USB key with non-volatile memory, any type of media suitable for storing electronic instructions or any other suitable type of computer-readable storage medium.

Users (including, but not limited to, users of the feedback system 10, spot buyers, representatives, contractors and agents thereof, and users and operators of the reference data storage apparatus 46, system storage devices 64, system server 70 and webserver 106) can use or operate any suitable input/output (I/O) device to transmit inputs that are directly or indirectly received by the feedback system 10, including, but not limited to, a personal computer (PC) (including, but not limited to, a desktop PC, a laptop or a tablet), smart television, Internet-enabled TV, person digital assistant, smartphone, cellular phone, a mobile communication device, a smart speaker, an electronic microphone, a virtual reality headset, or an augmented reality headset. In one embodiment, such I/O device has at least one input device (including, but not limited to, a touchscreen, a keyboard, a microphone, a sound sensor or a speech recognition device) and at least one output device (including, but not limited to, a speaker, a display screen, a monitor or an LCD).

In an embodiment, the computer-readable instructions, algorithms, logic and programmatic structure of the feedback logic 62 are implemented with any suitable programming or scripting language, including, but not limited to, C, C++, Java, COBOL, assembler, PERL, Visual Basic, SQL Stored Procedures, Extensible Markup Language (XML), Hadoop, "R," json, mapreduce, python, IBM SPSS, IBM Watson Analytics, IBM Watson and Tradeoff Analytics. The feedback logic 62 can be implemented with any suitable combination of data structures, objects, processes, routines or other programming elements.

In an embodiment, the interfaces of the feedback logic 62 (including, but not limited to, the output generator 74) can be Graphical User Interfaces (GUIs) structured based on a suitable programming language. Each GUI can include, in an embodiment, multiple windows, pulldown menus, popup elements, buttons, scroll bars, iconic images, wizards, mouse symbols or pointers, and other suitable graphical elements. In an embodiment, the GUI incorporates multimedia, including, but not limited to, sound, voice, motion video and virtual reality interfaces to generate outputs based on the execution of the feedback logic 62.

In an embodiment, the memory devices and data storage devices described above can be non-transitory mediums that store or participate in providing instructions to a processor for execution. Such non-transitory mediums can take different forms, including, but not limited to, non-volatile media and volatile media. Non-volatile media can include, for example, optical or magnetic disks, flash drives, and any of the storage devices in any computer. Volatile media can include dynamic memory, such as main memory of a computer. Forms of non-transitory computer-readable media therefore include, for example, a floppy disk, flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, or any other medium from which a computer can read programming code and/or data. Many of these forms of computer readable media may be involved in carrying one or more sequences of one or more instructions to a processor for execution. In contrast with non-transitory mediums, transitory physical transmission media can include coaxial cables, copper wire and fiber optics, including the wires that comprise a bus within a computer system, a carrier wave transpoting data or instructions, and cables or links transpoting such a carrier wave. Carrier-wave transmission media can take the form of electric or electromagnetic signals, or acoustic or light waves such as those generated during RF and IR data communications.

It should be appreciated that at least some of the subject matter disclosed herein includes or involves a plurality of steps or procedures that specify one or more methods. In an embodiment, some of the steps or procedures occur automatically as controlled by a processor or electrical controller. In another embodiment, some of the steps or procedures occur manually under the control of a human. In yet another embodiment, some of the steps or procedures occur semi-automatically as partially controlled by a processor or electrical controller and as partially controlled by a human.

As will be appreciated, aspects of the disclosed subject matter may be embodied as a system, method, or computer program product. Accordingly, aspects of the disclosed subject matter may take the form of an entirely hardware embodiment, an entirely software embodiment (including firmware, resident software, micro-code, etc.), or an embodiment combining software and hardware aspects that may all generally be referred to herein as a "service," "circuit," "circuitry," "module," and/or "system." Furthermore, aspects of the disclosed subject matter may take the form of a computer program product embodied in one or more computer readable mediums having computer readable program code embodied thereon.

Aspects of the disclosed subject matter are described herein in terms of steps and functions with reference to flowchart illustrations and block diagrams of methods, apparatuses, systems and computer program products. It should be understood that each such step, function block of the flowchart illustrations and block diagrams, and combinations thereof, can be implemented by computer program instructions. These computer program instructions may be provided to a processor of any suitable computer or programmable data processing apparatus to produce a machine, such that the instructions, which execute via the processor of the computer or other programmable data processing apparatus, create results and output for implementing the functions described herein.

These computer program instructions may also be stored in a computer readable medium that can direct a computer, other programmable data processing apparatus, or other devices to function in a particular manner, such that the instructions stored in the computer readable medium produce an article of manufacture including instructions which implement the functions described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions described herein.

Additional embodiments include any one of the embodiments described above, where one or more of its components, functionalities or structures is interchanged with, replaced by or augmented by one or more of the components, functionalities or structures of a different embodiment described above.

It should be understood that various changes and modifications to the embodiments described herein will be apparent to those skilled in the art. Such changes and modifications can be made without departing from the spirit and scope of the present disclosure and without diminishing its intended advantages. It is therefore intended that such changes and modifications be covered by the appended claims.

Although several embodiments of the disclosure have been disclosed in the foregoing specification, it is understood by those skilled in the art that many modifications and other embodiments of the disclosure will come to mind to which the disclosure pertains, having the benefit of the teaching presented in the foregoing description and associated drawings. It is thus understood that the disclosure is not limited to the specific embodiments disclosed herein above, and that many modifications and other embodiments are intended to be included within the scope of the appended claims. Moreover, although specific terms are employed herein, as well as in the claims which follow, they are used only in a generic and descriptive sense, and not for the purposes of limiting the present disclosure, nor the claims which follow.

The following is claimed:

1. A method comprising:
    accessing ad inventory data related to one or more media providers;
    receiving a request related to an advertising opportunity, wherein the request comprises purchase data related to a plurality of ad placements available at a plurality of purchase prices; and
    after the request is accepted and each of the ad placements is cleared, executing a plurality of computer-readable instructions to:
        receive reference data during an in-process period that begins when the ad placement is aired according to an advertising campaign, wherein the advertising campaign is implemented based on the purchase data, wherein the purchase data comprises a purchase price related to the ad placement, wherein the reference data comprises:
            first reference data received from a first reference data source, wherein the first reference data is arranged in accordance with a first data organization, wherein the first reference data at least partially depends on one or more first events that occur during the in-process period; and
            second reference data received from a second reference data source comprising second reference data arranged in accordance with a second data organization that differs from the first data organization, wherein the second reference data at least partially depends on one or more second events that occur during the in-process period;
        during the in-process period, determine a plurality of feedback metrics related to each one of the ad placements, wherein the feedback metrics depend at least partially on the reference data, wherein the feedback metrics comprise:
            an audience metric indicating one or more audience attributes of an audience related to the ad placement;
            an impression cost metric related to the ad placement;
            a response cost metric indicating both a cost of the ad placement and a market response to the ad placement; and
            an audience timing metric indicating whether the ad placement was cleared for a time period during which an audience level was one of: above a threshold audience level or below the threshold audience level;
        during the in-process period, repeat the determination of one or more of the feedback metrics after a variation in the reference data occurs; and
        during the in-process period, with respect to each one of the ad placements:
            perform a determination related to the ad placement, wherein the determination depends on a plurality of the feedback metrics, wherein the determination results in a determined price; and
            cause an output device to indicate a feedback comprising:
                a plurality of the feedback metrics; and
                a price differential derived from comparing the determined price related to the ad placement to the purchase price related to the ad placement,
            wherein the feedback is useful for a purpose of adjusting the advertising campaign during the in-process period.

2. The method of claim 1, wherein:
    at least one of the media providers displays one or more TV shows;
    each of the TV shows comprises one of a TV program, an episode of a TV program series, or a movie; and
    each of the TV shows comprises one of an over-the-air distribution format, a satellite distribution format, a cable distribution format, an on-demand distribution format, or a streaming distribution format.

3. The method of claim 1, wherein:
    the purchase price is at least part of an actual rate; and
    the determined price is at least part of a target rate, wherein the determined price comprises a justifiable price.

4. The method of claim 1, wherein:
    each of the media providers displays one or more TV shows in accordance with an airing schedule determined by the media provider; and
    each of the ad placements comprises a direct response ad.

5. The method of claim 1, wherein:
    at least one of the media providers displays one or more TV shows in response to inputs received from audience members; and
    each of the ad placements comprises a direct response ad.

6. The method of claim 1, wherein, with respect to each of the ad placements, the purchase data comprises:

a TV network identifier;
a TV show identifier;
an airing schedule;
a daypart identifier;
a time length of the ad placement; and
the determined price related to the ad placement.

7. The method of claim 1, wherein the first and second reference data sources comprise a plurality of different databases, wherein the different databases comprise:
one or more impression databases published by one of The Nielson Company or an affiliate of The Nielson Company;
one or more competitor airing databases published by one of The Nielson Company or the affiliate of The Nielson Company;
one or more Mediamark Research & Intelligence databases published by one of GfK SE or an affiliate of GfK SE; and
one or more consumer demographics databases published by Resonate Networks, Inc. or an affiliate of Resonate Networks, Inc.

8. The method of claim 7, wherein:
a plurality of the different databases comprise different data organizations;
at least one of the data organizations organizes a common data type field differently from another one of the data organizations; and
the method comprises executing the computer-readable instructions to:
extract data from the common data type fields of the databases in accordance with a mapping specification; and
process the extracted data.

9. The method of claim 1, wherein the threshold audience level is associated with an average audience level.

10. The method of claim 1, wherein:
the audience timing metric comprises a historical audience timing metric related to a past date that occurred before a time point during the in-process period; and
the feedback metrics comprise an expected audience timing metric related to a future date, wherein the expected audience timing metric indicates whether the ad placement, if cleared at the time point, would be cleared for a time period during which the audience level would be one of: above a threshold audience level or below the threshold audience level.

11. The method of claim 10, comprising executing the computer-readable instructions to generate a clearance interface that indicates the historical audience timing metric and the expected audience timing metric.

12. The method of claim 10, comprising executing the computer-readable instructions to generate, for each of the ad placements, a management interface that indicates:
a TV network identifier;
an airing schedule;
a time length of the ad placement;
the purchase price related to the ad placement;
the audience timing metric;
the impression cost metric;
the response cost metric;
the audience metric;
the determined price; and
the difference between the purchase price and the determined price.

13. The method of claim 1, comprising executing the computer-readable instructions to generate, for each of the ad placements, a monitoring interface during the in-process period that displays a plurality of performance symbols related to the advertising campaign, wherein the performance symbols comprise:
a spend symbol indicating spend comparison information relating to actual spend compared to budgeted spend;
a clearance symbol indicating a deviation of the audience level from the threshold audience level;
an impression cost symbol indicating impression cost comparison information relating to actual impression cost compared to a reference impression cost;
a first audience symbol indicating an audience quality score that is variable relative to an audience threshold quality score; and
a second audience symbol indicating an extent of change in the audience level.

14. One or more data storage devices comprising:
a plurality of computer-readable instructions that, when executed by a processor, cause the processor to:
receive reference data during an in-process period that begins when at least one ad placement has been published based on an advertising campaign, wherein the advertising campaign is implemented based on purchase data, wherein the reference data comprises first reference data arranged in accordance with a first data organization and second reference data arranged in accordance with a second data organization that differs from the first data organization, wherein the purchase data comprises a purchase price related to the at least one ad placement;
during the in-process period, with respect to the at least one ad placement:
determine a plurality of metrics related to the at least one ad placement, wherein the metrics depend at least partially on the reference data;
conduct a determination related to the at least one ad placement, wherein the determination depends at least partially on a plurality of the metrics;
repeat the determination, wherein:
each of the determinations results in a determined price that comprises a price amount that is one of greater than or less than the purchase price, wherein the price amount depends on the metrics;
each of the price amounts is determinable based on a change in the reference data that occurs during the in-process period; and
cause an output device to indicate information based on a difference between at least one of the price amounts and the purchase price related to the at least one ad placement.

15. The one or more data storage devices of claim 14, wherein the metrics related to the at least one ad placement comprise an audience timing metric indicating whether the ad placement was cleared for a time period during which an audience level was one of: above a threshold audience level or below the threshold audience level.

16. The one or more data storage devices of claim 14, wherein the metrics related to the at least one ad placement comprise a response cost metric that is variable relative to a threshold response score, wherein the response cost metric indicates both a cost of the ad placement and a market response to the ad placement.

17. The one or more data storage devices of claim 16, wherein the metrics related the at least one ad placement comprise:
an impression cost metric related to the at least one ad placement; and an audience metric indicating one or more audience attributes of an audience related to the at least one ad placement.

18. An assembly comprising:
one or more processors; and
a non-transitory medium operatively coupled to the one or more processors, wherein the non-transitory medium stores a plurality of computer-readable instructions that, when executed by the one or more processors, cause the one or more processors to:
receive reference data during an in-process period that occurs after at least one ad placement has been aired in accordance with an advertising campaign, wherein the advertising campaign is implemented based on purchase data, wherein the reference data comprises first reference data arranged in accordance with a first data organization and second reference data arranged in accordance with a second data organization that differs from the first data organization, wherein the purchase data comprises an actual rate related to the at least one ad placement; and
during the in-process period, with respect to the at least one ad placement:
determine a plurality of metrics related to the at least one ad placement, wherein the metrics depend at least partially on the reference data;
perform a determination related to the at least one ad placement, wherein:
the determination depends at least partially on a plurality of the metrics,
the determination results in a determined rate that comprises a price amount that is one of greater than or less than the actual rate;
the price amount depends on the metrics; and
the price amount is determinable based on a change in the reference data that occurs during the in-process period; and
cause an output device to indicate information based on a difference between the determined rate and the actual rate related to the at least one ad placement.

19. The assembly of claim 18, wherein:
the metrics related to each of the ad placements comprise an audience timing metric indicating whether the at least one ad placement was cleared for a time period during which an audience level was one of: above a threshold audience level or below the threshold audience level; and
the metrics related to the at least one ad placement comprise a response cost metric that is variable relative to a threshold response score, wherein the response cost metric indicates both a cost of the ad placement and a market response to the ad placement.

20. The assembly of claim 18, wherein the computer-readable instructions, when executed by the one or more processors, cause the one or more processors to repeat the determination during the in-process period with respect to the at least one ad placement, wherein each of the determinations results in one of the determined rates that comprises one of the price amounts that is one of greater than or less than the actual rate, wherein each of the price amounts depends on the metrics, wherein each of the price amounts is determinable based on a change in the reference data that occurs during the in-process period.

21. The method of claim 1, wherein:
the purchase price comprises a bid-accepted price; and
the determined price comprises a target price.

22. The method of claim 1, wherein, with respect to each of the ad placements:
the reference data comprises advertisement industry data that is not derived from any audience responses to the ad placement;
the advertisement industry data is variable during the in-process period;
the feedback metrics depend at least partially on the advertisement industry data; and
the feedback is variable depending on a variation in the advertisement industry data.

23. The method of claim 22, wherein the advertisement industry data comprises one of:
purchase data based on a purchasing of ad spots in an advertisement industry by advertisement purchasers;
advertising cost data;
data pertaining to advertisement viewers comprising one of a viewer attribute, a viewer characteristic, a viewership level, or a viewer demographic; or
cost per one thousand impressions (CPM) incurred by advertisement purchasers.

24. The one or more data storage devices of claim 14, wherein:
the reference data comprises advertisement industry data that is not derived from any audience responses to the at least one ad placement;
the purchase price comprises a paid price;
the determined price comprises a target price; and
the information is variable depending on a variation in the advertisement industry data.

25. The one or more data storage devices of claim 24, wherein the advertisement industry data comprises one of:
purchase data based on a purchasing of ad spots in an advertisement industry by advertisement purchasers;
advertising cost data;
data pertaining to advertisement viewers comprising one of a viewer attribute, a viewer characteristic, a viewership level, or a viewer demographic; or
cost per one thousand impressions (CPM) incurred by advertisement purchasers.

26. The one or more data storage devices of claim 24, wherein:
the reference data comprises societal data that is variable based on one or more societal events other than any audience responses to the at least one ad placement;
the one or more societal events comprise one of: a change in a consumer purchasing activity, an occurrence of a consumer spending trend, a change in a consumer behavior, an occurrence of a consumer demand, a change in a media type viewed by consumers, a change in a market, a change in an economy, a change in joblessness, a change in an interest rate, a change in a home value, a change in public health, a change in weather, a change in climate, a change in a law, a change in an elected official, a change in a legislator, a change in a political climate, or an occurrence of a war; and
the information is variable depending on a variation in the societal data.

* * * * *